(12) United States Patent
Hashizume et al.

(10) Patent No.: US 8,320,229 B2
(45) Date of Patent: Nov. 27, 2012

(54) VARIABLE MIRROR ACTUATOR AND OPTICAL DISC DRIVE

(75) Inventors: Jiro Hashizume, Toride (JP); Yoshiaki Yamauchi, Omitama (JP); Tatsuro Ide, Kawasaki (JP); Koichi Watanabe, Hachioji (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/945,065

(22) Filed: Nov. 12, 2010

(65) Prior Publication Data
US 2011/0110204 A1    May 12, 2011

(30) Foreign Application Priority Data

Nov. 12, 2009    (JP) .................................. 2009-258704
Jun. 2, 2010    (JP) .................................. 2010-126433

(51) Int. Cl.
*G11B 7/00* (2006.01)
(52) U.S. Cl. .................................. 369/112.29; 369/44.14
(58) Field of Classification Search ............. 369/112.29, 369/112.28, 44.23, 44.14–44.16
See application file for complete search history.

(56) References Cited

U.S. PATENT DOCUMENTS

| | | | |
|---|---|---|---|
| 5,719,846 A * | 2/1998 | Matoba et al. | 369/112.29 |
| 6,995,897 B2 * | 2/2006 | Mushika et al. | 369/44.23 |
| 2005/0122856 A1 * | 6/2005 | Nagashima | 369/44.23 |
| 2006/0087928 A1 * | 4/2006 | Hashimoto | 369/44.11 |
| 2007/0097836 A1 * | 5/2007 | Kurozuka et al. | 369/112.29 |
| 2008/0310287 A1 * | 12/2008 | Aoki et al. | 369/112.29 |

FOREIGN PATENT DOCUMENTS

| | | |
|---|---|---|
| JP | 2000-057616 | 2/2000 |
| JP | 2001-045067 | 2/2001 |
| JP | 2005-122828 | 5/2005 |
| JP | 2006-155850 | 6/2006 |

* cited by examiner

*Primary Examiner* — Thang Tran
(74) *Attorney, Agent, or Firm* — Antonelli, Terry, Stout & Kraus, LLP.

(57) ABSTRACT

A pickup and a drive, in a small size, having a spherical aberration correction device capable of correcting various spherical aberration, and coma aberration and/or astigmatism with a low power consumption. A variable-focus lens actuator can correct spherical aberration such that a transparent deformation film warps into a parabolic shape when a magnetic field is applied thereto, thereby changing the light intensity distribution of transmitted light. Further, the variable-focus lens actuator can correct coma aberration and/or astigmatism by arbitrarily tilting the transparent film to change the proceeding direction of the transmitted light.

20 Claims, 21 Drawing Sheets

First embodiment

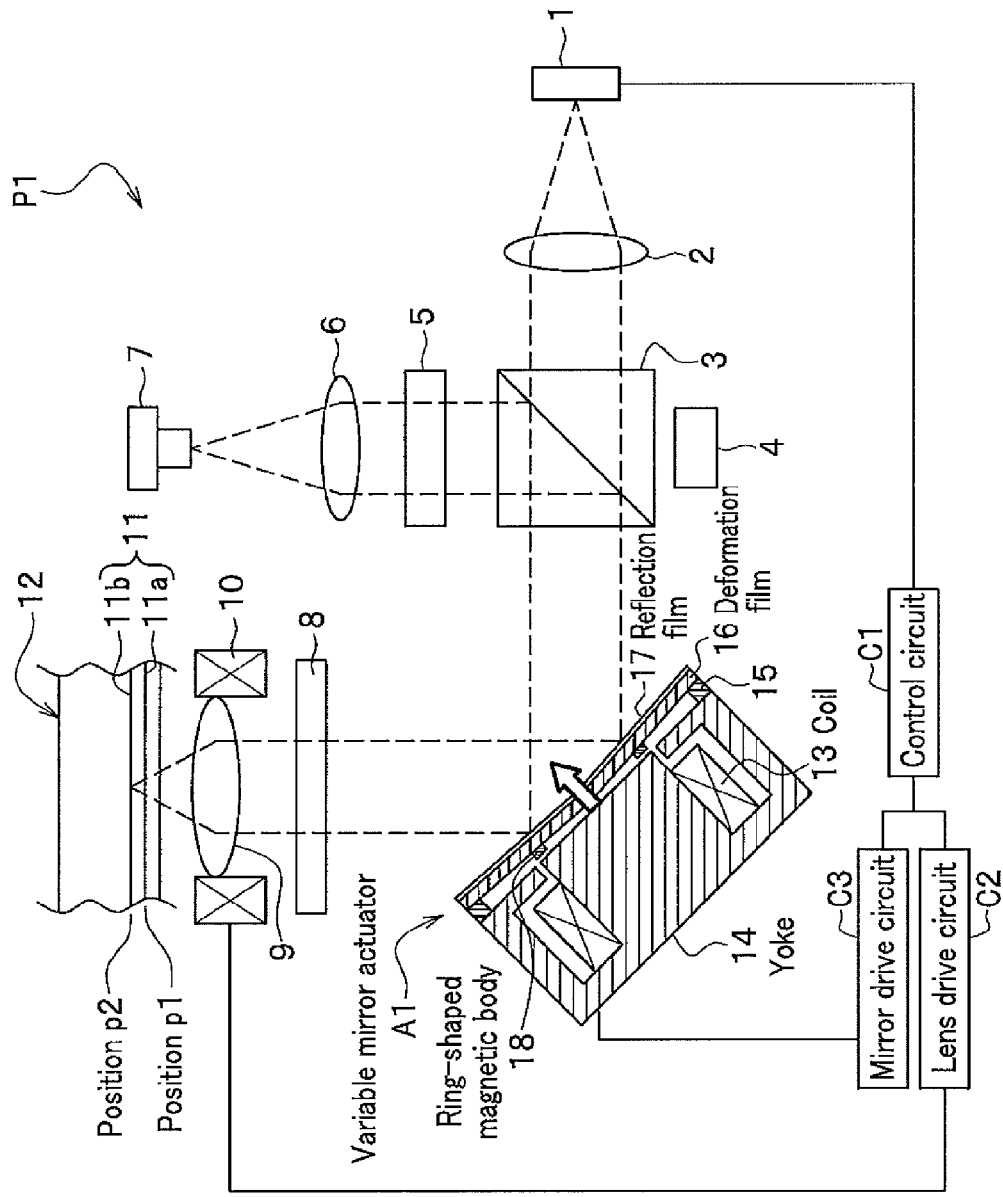

Arrow view in Direction A of deformation film 16, ring-shaped magnetic body 18, etc. in Fig. 2A

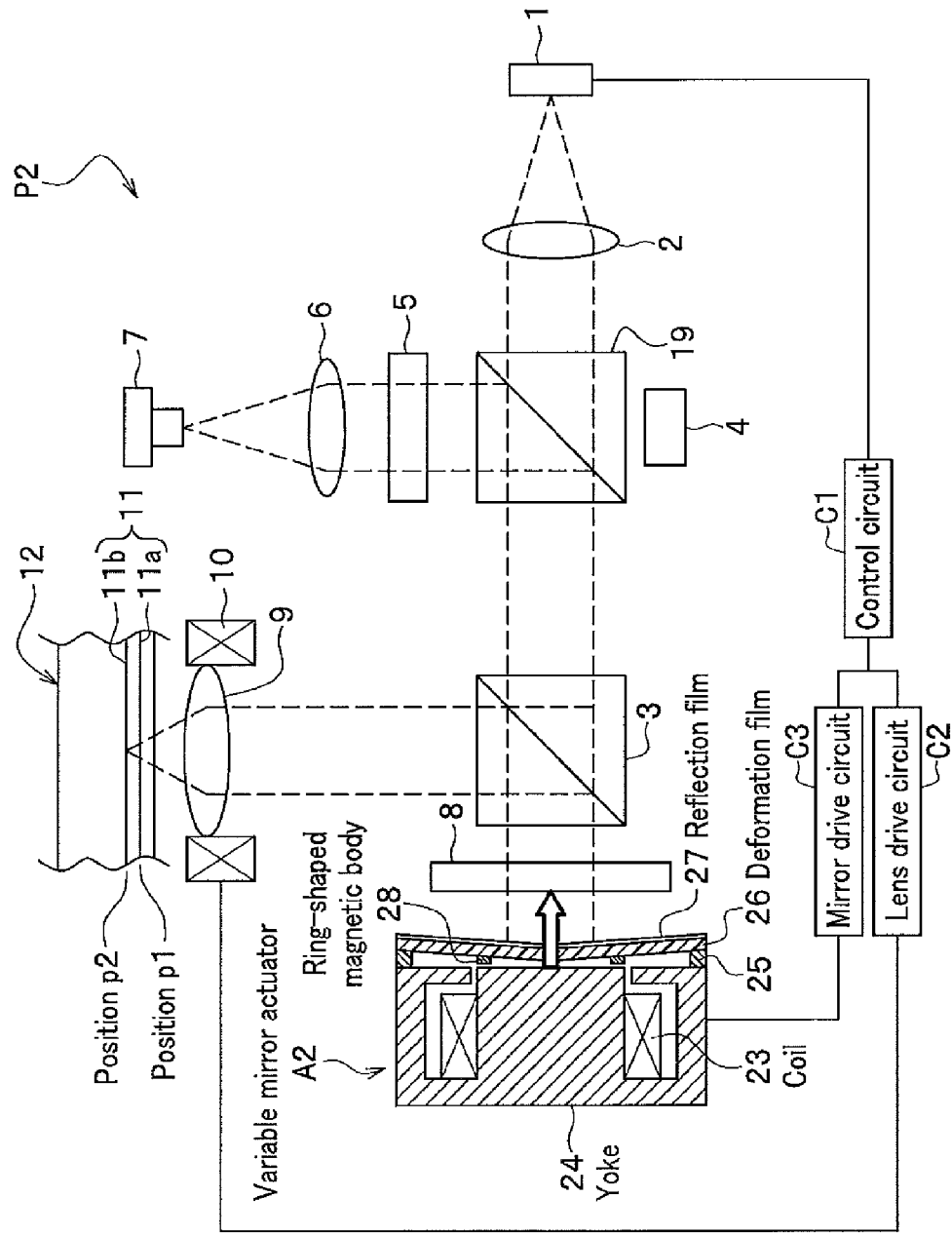

Arrow view in Direction B of deformation film 26, ring-shaped magnetic body 28, etc. in Fig. 4A Third embodiment Fourth embodiment Fifth embodiment Cross-sectional view with respect to line C-C in Fig. 7A Sixth embodiment Cross-sectional view with respect to line D-D in Fig. 8A Cross-sectional view with respect to line E-E in Fig. 8A Seventh embodiment Arrow view in Direction F of deformation
film 76 and reflection film 77 in Fig. 9A Eighth embodiment Arrow view in Direction G of deformation film 86,
high conductive body 88, etc. in Fig. 10A Ninth embodiment Tenth embodiment Arrow view in direction H in Fig. 14A Top view in direction arrow-A Cross-sectional view with respect to line C-C

US 8,320,229 B2

VARIABLE MIRROR ACTUATOR AND OPTICAL DISC DRIVE

CROSS-REFERENCE TO RELATED APPLICATION

The application claims the foreign priority benefit under Title 35, United States Code, Section 119(a)-(d) of Japanese Patent Application No. 2009-258704 filed on Nov. 12, 2009 and Japanese Patent Application No. 2010-126433 filed on Jun. 2, 2010 the contents of which are hereby incorporated by reference.

BACKGROUND OF THE INVENTION

1. Field of the Invention

The present invention relates to a variable lens actuator which enables deformation of a lens surface, having an element with a variable optical characteristic, such as a variable-focus lens, an aberration correction lens, etc., and relates to an optical disc drive using the same.

2. Related Art

Recent increase in the amount of electronic information accompanying the penetration of the Internet and the improvement in images for a higher quality has been steadily accelerating higher density of optical discs, which belong to one category of major image recording media. For high density, in general, methods are employed including one that reduces the size of an optical spot of focused light by increasing the number of openings of an objective lens and shortening the wavelength and one that forms multiple recording layers.

Because light from a semiconductor laser is focused on an optical disc through a substrate, spherical aberration occurs, wherein the spherical aberration depends on the wavelength of the laser light, the number of openings of an objective lens, and the thickness of the substrate (the distance between the incident plane of the disc and a recording layer, hereinafter referred to as the substrate thickness). Since this spherical aberration is proportional to the fourth power of the number of openings of the objective lens, the spherical aberration caused by the error variation in the substrate thickness sharply increases with an increase in the number of openings. Further, the difference between the substrate thickness for the recording layer closest to the incident plane of laser beams and that for the recording layer farthest from the incident plane comes to several ten μm (micrometers) as a result of lamination of multiple recording layers, and accordingly, a mechanism is essential that corrects the spherical aberration caused by these to realize normal recording and reproducing operation.

Further, as a material of the objective lens of an optical pickup, glass, plastic, etc. are considered. Plastics are advantageous over glasses in terms of cost, mass-productivity, and the like, and plastic objective lenses are used for many optical pickups in recent years. However, a plastic lens changes much more significantly in the refraction index with the temperature compared with a glass lens, resulting in an increase in the spherical aberration caused by temperature variation. Accordingly, a mechanism for correcting the spherical aberration caused by a change in the temperature is essential particularly for a plastic objective lens.

On the other hand, for an optical pickup, aberrations, such as coma aberration, astigmatism, etc. are caused by errors in the disc tilt of an optical disc with respect to the optical axis of a laser and in the assembly of an optical pickup. Therefore, it is necessary to correct these aberrations.

Spherical aberration is aberration that is rotationally symmetric with respect to the optical axis, and spherical aberration can be made, for example, by moving the lens of an optical pickup in the direction of the optical axis, providing a variable-focus lens on the optical pickup to change the focal length of the variable-focus lens, or the like. On the other hand, coma aberration or astigmatism is aberration that is rotationally asymmetric with respect to the optical axis, and can be made by, for example, using a transparent type liquid crystal element and optimizing a voltage pattern to be applied to the liquid crystal element.

Japanese Patent Application Laid-open no. H13-45067 (Patent Document 1) discloses a technology for an optical pickup, wherein spherical aberration due to error variation in the substrate thickness is corrected by generating spherical aberration with a symbol opposite to the spherical aberration due to the error variation in the substrate thickness, through moving the lens, whose spherical aberration is to be corrected, in the direction of the optical axis with an actuator.

FIG. 15 is a diagram showing an example of an optical system of an optical pickup having a conventional aberration correction mechanism 223.

In order to correct a change in the spherical aberration due to the positional change of a recording layer 211 of an optical disc 212 (the positional change of a recording layer 211a and a recording layer 211b) or the like, conventionally, the divergence angle of a laser beam entering from a laser light source 207 into an objective lens 209 is changed by displacing the position of a lens 221 with respect to the optical axis thereof, using a single axis actuator with a motor 222.

Further, for an optical pickup described in Japanese Patent Application Laid-open No. H12-57616 (Patent Document 2), a technology of correcting spherical aberration by a signal from a detector, using a transparent type liquid crystal element that generates an optical phase difference, is disclosed.

For an optical pickup described in Japanese Patent Application Laid-open No. 2006-155850 (Patent Document 3), a technology of correcting spherical aberration is disclosed wherein the reflection surface of a reflection mirror for reflecting a laser beam to an objective lens is warped into a parabolic shape to change the intensity distribution pattern of laser beams entering an objective lens.

For a liquid crystal aberration correction element having two transparent electrode surfaces, Japanese Patent Application Laid-open No. 2005-122828 (Patent Document 4) discloses a technology, wherein a transparent electrode pattern for correction of coma aberration along the radial direction of an optical disc on one hand and a transparent electrode pattern for correction of coma aberration and astigmatism along the tangential direction of the optical disc on the other hand are provided to generate coma aberration and astigmatism by the liquid crystal aberration correction element, so as to correct coma aberration and astigmatism caused on an optical pickup.

SUMMARY OF THE INVENTION

Problems to be Solved by the Invention

However, in the example described in Patent Document 1, a further spherical aberration SA1 occurs accompanying the lamination of multiple layers of a next-generation optical disc, which requires further greater parallel translation of the lens along the optical axis direction to correct the spherical aberration SA1. For example, lamination of four or more layers may require a translation of the lens by z1=several centimeters along the optical axis direction for correction. On the other hand, apart from the large spherical aberration SA1 caused by the lamination of multi layers of the optical disc, a spherical aberration SA2, such as spherical aberration caused by an objective lens (particularly by a plastic lens) due to the error variation in the substrate thickness, variation in the wave-length of lasers, or the variation in temperature, the spherical aberration SA2 being smaller than the spherical aberration SA1, also needs correction. Therefore, it may be necessary to move the lens by fine steps of z2=several ten micrometers along the optical axis direction. Since a movement amount z of a lens and a spherical aberration SA to be corrected are substantially in a proportional relationship, it is impossible to independently design movement amounts z1, z2 necessary for correction of spherical aberrations SA1, SA2. For the structure described in Patent Document 1, it is difficult to perform both a large movement of the lens by several cm and a small and highly accurate movement of the lens by several μm. Further, this structure has a complicated spherical aberration correction mechanism and requires a large installation space. Therefore, for an optical pickup, for which a small size and a low thickness are essential, there is a problem that it is difficult to ensure a space for disposing components. Further, for this structure, it is difficult to correct coma aberration and astigmatism.

Further, in order to correct a large spherical aberration SA1 in the example described by Patent Document 2, it is necessary to set an application voltage to the liquid crystal element for generation of an optical phase difference to be extremely high, and further, a large number of electrode patterns is necessary, which are impractical.

On the other hand, in the example described in Patent Document 3, the number of drive electrodes for the variable mirror is small, the function of the spherical aberration correction actuator and the function of the reflection mirror are merged, and thus the structure is suitable for downsizing, however, a large number of machining works are necessary for manufacturing the reflection mirror with a complicated cross-sectional shape, resulting in a high cost. Further, as the distance between the electrodes at the center of the mirror and that at the end of the mirror are different from each other due to the warp of the mirror, there is a problem, to be solved, of difficulty in applying a uniform deforming force to the mirror.

Still further, the liquid crystal element described in Patent document 4 enables correction of coma aberration and astigmatism, but does not allow simultaneous correction of spherical aberration.

Addressing these problems, an object of the invention is to provide a variable-focus lens actuator, in a small size, that enables correction of various spherical aberrations of a variable-focus lens by a simple control and with low power consumption. Further, another object of the invention is to provide a unit that not only corrects various spherical aberrations including a large spherical aberration SA1, in an optical pickup for which a small size and a thin shape are essential, caused by lamination of multiple layers of an optical disc, and a spherical aberration SA2 smaller compared with the spherical aberration SA1, such spherical aberration caused by an objective lens (particularly by a plastic lens) due to error variation in the substrate thickness, variation in wavelength of laser, and variation in temperature, but also simultaneously corrects comma aberration and astigmatism caused by the disc tilt of the optical disc with respect to the optical axis and an error in the assembly of the optical pickup.

Means for Solving the Problems

An optical pickup in accordance with the invention includes a plurality of spherical aberration correction mechanisms, wherein a first spherical aberration correction mechanism corrects a large spherical aberration SA1 caused by lamination of multiple layers of an optical disc. Further, the second spherical aberration correction mechanism corrects a spherical aberration SA2 smaller compared with the spherical aberration SA1, such spherical aberration SA2 as spherical aberration caused by an objective lens due to error variation in the substrate thickness, variation in wavelength of laser, and variation in temperature. At least one of the first and second spherical aberration correction mechanisms has a feature that also corrects wavefront aberration, such as coma aberration and astigmatism, which are rotationally asymmetric with respect to the optical axis of the lens.

The first or second spherical aberration correction mechanism, which corrects such coma aberration and astigmatism, includes a variable-focus lens actuator. This variable-focus lens actuator is provided with a lens member refracting light for irradiation, a magnetic-force applying member for applying a warping force to the lens member when a magnetic field is applied thereto, and an electromagnetic structure that applies the magnetic field to the magnetic-force applying member when a current is applied to the electromagnetic structure so that the lens member is warped into a desired shape.

Or, the first and/or second spherical aberration correction mechanism, which corrects coma aberration and astigmatism, includes a transparent type liquid crystal element. This transparent type liquid crystal element has a plurality of transparent electrode surfaces, wherein the first transparent electrode is provided with an electrode pattern for correction of spherical aberration, and the second transparent electrode is provided with an electrode pattern for correction of coma aberration and astigmatism.

The other spherical aberration correction mechanism includes, for example, a mechanism that translates the lens of a pickup by an actuator along the optical axis. Or, the other spherical aberration correction mechanism includes a deformation mirror device whose mirror surface is deformable with respect to a predetermined position of the optical pickup.

Advantages of the Invention

According to the invention, an optical pickup capable of correcting various spherical aberration and astigmatism can be realized, wherein the optical pickup is in a small size and the correction is performed by a simple control with low power consumption.

BRIEF DESCRIPTION OF THE DRAWINGS

FIG. 1 is a schematic diagram of the optical system of an optical pickup incorporating a variable mirror actuator of a variable-focus lens device in a first embodiment;

FIG. 3 is a diagram showing an example of the outline of the optical system of an optical pickup incorporating a variable mirror actuator in a second embodiment;

DESCRIPTION OF THE PREFERRED EMBODIMENTS

Embodiments in accordance with the invention will be described below, referring to the attached drawings.

Figure 16:
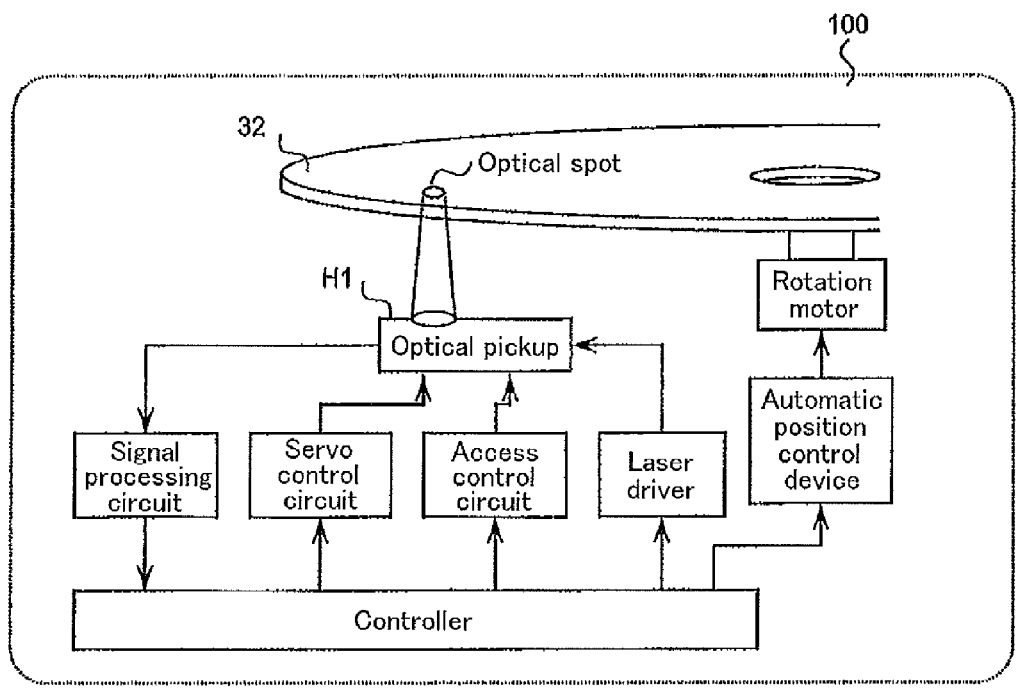
FIG. 16 is an entire schematic view of an optical disc drive in accordance with the invention.

FIG. 16 shows an example of an entire structure of an optical disc drive in an embodiment in accordance with the invention.

An optical disc drive 100 is provided with an optical pickup H1 and a rotation motor, and an optical disc 32 is rotatable by the rotation motor.

The optical pickup H1 has a role to irradiate the optical disc 32 with light and record and/or reproduce digital information. A reproduced light detected by the optical pickup H1 is subjected to current-voltage (IV) conversion, and then input to a signal processing circuit. A reproduction signal and a servo signal are generated by the signal processing circuit to be transmitted to a controller.

The controller controls a servo control circuit, an access control circuit, and an automatic position control unit, based on the servo signal. The automatic control unit controls the rotation of the optical disc 32, by the rotation motor; the access control circuit controls the position of the optical pickup H1; and the servo control circuit controls the position of a later-described objective lens of the optical pickup H1 and the like. In such a manner, an optical spot is located at an arbitrary position of the optical disc 32. Further, the controller controls a laser driver depending on reproduction or recording, and makes a laser included in the later-described optical pickup H1 emit light with an appropriate power/waveform.

The optical disc drive 100 enables recording/reproducing on/from a multi-layer optical disc having a plurality of recording layers, and the controller controls a later-described spherical aberration correction mechanism to correct generated spherical aberration, corresponding to a layer as an object. Further, the controller controls a later described spherical aberration correction mechanism to correct coma aberration and astigmatism caused by the disc tilt of the optical disc with respect to the optical axis or an error in assembling the optical pickup.

Figure 21:
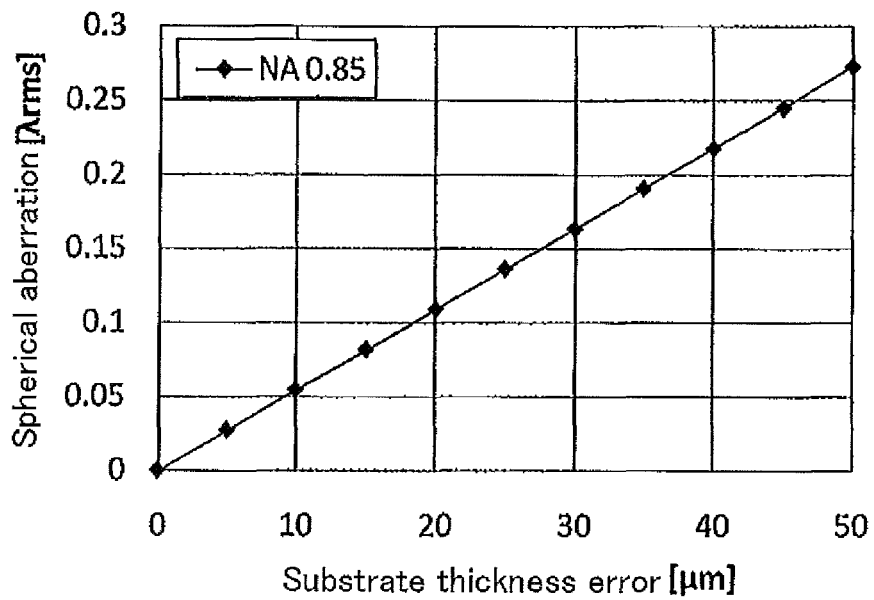
FIG. 21 is a diagram showing the relationship between the substrate thickness error of an optical disc and spherical aberration caused thereby.

FIG. 21 is a diagram showing the relationship between the substrate thickness error of an optical disc, having NA of the objective lens be 0.85, namely a Blue-Ray Disc (BD), and the amount of spherical aberration caused thereby. The objective lens of many optical pickups for BD is designed such that the spherical aberration becomes zero at the substrate thickness of 0.0875 mm, which is the middle position between a layer L0 (substrate thickness of 0.1 mm) and a layer L1 (substrate thickness of 0.075 mm) of a 2-layer BD. In this case, when the position of the recording layer deviates from this thickness, spherical aberration as shown in FIG. 21 occurs. As shown, the amount of spherical aberration is substantially proportional to the substrate thickness error, and, for example, an extremely large spherical aberration such large as approximately 300 mλrms occurs on the recording layer with deviation of 50 μm. This disables focusing a spot and correct reading of information of the optical disc. On the other hand, spherical aberration caused by the objective lens due to variation in the substrate thickness error, variation in the wavelength of laser, variation in temperature, or the like, also disables accurate focusing of a spot. These spherical aberrations are in a smaller amount compared with the above-described spherical aberration, however, vary even during focusing on a certain recording layer, for which correction of the above-described spherical aberration has been made, of a multi-layer optical disc, and accordingly fine adjustment is necessary. Further, for an optical pickup, there are cases of intentionally varying spherical aberration such that the strength of a reproduction signal becomes the maximum and thereby searching for a state that the spherical aberration is optimally corrected. In such a case, it is desirable that spherical aberration can be finely adjusted.

First Embodiment

FIG. 1 is a diagram showing an example of the outline of an optical system of an optical pickup P1 incorporating a variable mirror actuator A1 of a variable-focus lens device in a first embodiment.

The variable mirror actuator A1 in the first embodiment enables spherical aberration correction by arbitrarily deforming the reflection surface of a reflection mirror (reflection film 17) for reflecting a laser beam.

An optical pickup P1, on which an optical disc 12 formed with a plurality of recording layers 11 (11b, 11b) is mounted, is provided with a laser light source 7 for emitting laser beams to irradiate the recording layers 11 of the optical disc 12, and a detector 11 for detecting laser beams reflected by the recording layers 11 of the optical disc 12.

On the optical path of a laser beam from the laser light source 7 via the recording layers 11 of the optical disc 12 to the detector 1, the optical pickup P1 is provided with a polarized light beam splitter 3 for splitting a laser beam from the laser light source 7 or the recording layer 11 of the optical disc 12 by reflecting and transmitting, a variable mirror actuator A1 for reflecting the laser beam, the laser beam having been emitted from the laser light source 7 and reflected by the polarized light beam splitter 3, toward the recording layer 11 of the optical disc 12 and for reflecting the laser beam toward the detector 1, the laser beam having been reflected by the recording layer 11, a ¼ wavelength plate 8 for converting linear polarized light into circular polarized light, an objective lens 9 translated along the optical axis direction by a lens actuator 10 to focus the laser beam onto the recording layer 11 of the optical disc 12, and a condensing lens 2 for focusing the laser beam reflected by the recording layer 11 onto the detector 1.

Between the laser light source 7 and the polarized beam splitter 3 of the optical pickup P1, there are provided a collimate lens 6 for making a laser beam from the laser light source 7 into a parallel light, and a grating 5 for splitting a laser beam having been collimated by the collimate lens 6.
Variable-Mirror Actuator A1

Figure 2A:
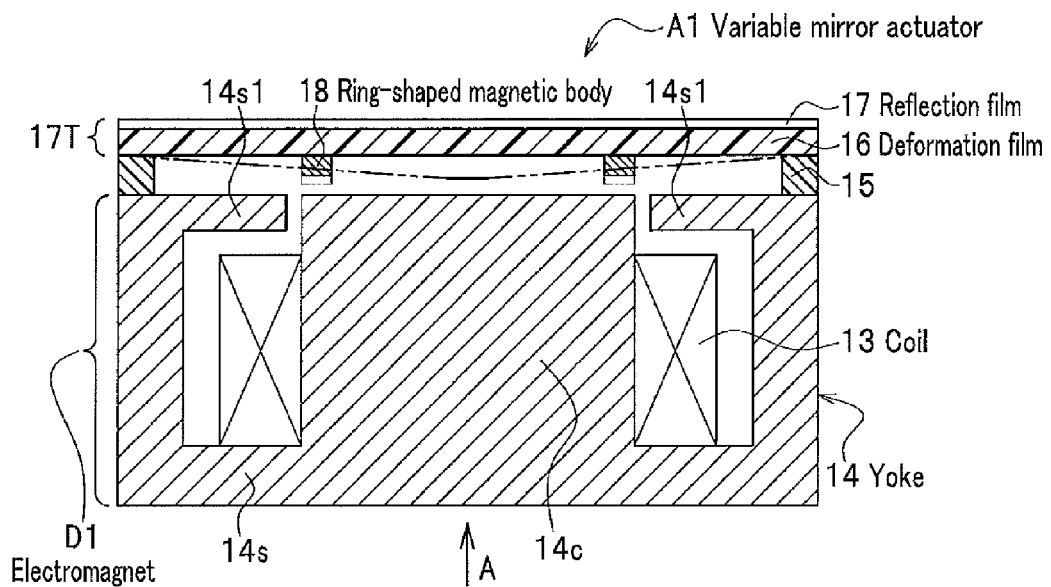
FIG. 2A is a vertical cross-sectional view of the variable mirror actuator, shown as an example, with respect to the axial direction in the first embodiment.
Figure 2B:
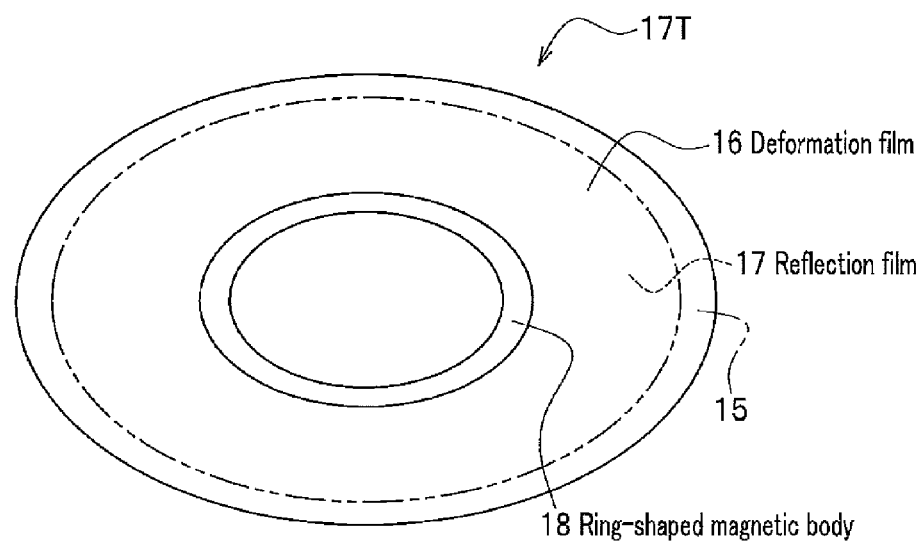
FIG. 2B is a diagram of a view, from direction A in FIG. 2A, of a deformation film formed integrally with a reflection film, and a magnetic body fixed on the deformation film.

FIG. 2A is a vertical cross-sectional view of the variable mirror actuator A1, shown as an example, with respect to the axial direction. FIG. 2B is a diagram of a view, from direction A in FIG. 2A, of a deformation film 16 formed integrally with a reflection film 17 of the variable mirror actuator A1, and a ring-shaped magnetic body 18 fixed with the deformation film 16.

For the variable mirror actuator A1, as shown in FIG. 1, the reflection film 17 for reflecting laser beams is formed in a shape of a flat plate, using a material that reflects laser beams, for example, a dielectric multi-layer film or the like containing metal such as aluminum or silver, SiO2, or TiO2. In such a manner, the reflection film 17 may be a single layer film of a metal or the like, and may be a multi-layer reflection film using a dielectric or the like.

Herein, a laser beam has a circular cross-section and enters the reflection film 17 at an angle of 45 degrees. Therefore, the reflection film 17 is formed in a flat plate shape of an ellipse with a long axis in the laser beam travelling direction so that a laser beam having been reflected by the reflection film 17 becomes to have a circular cross-section similar to that before reflection.

The reflection film 17 is, as shown in FIG. 2A, laminated on one surface of the deformation film 16 of, for example, a silicon substrate and the like, in the same shape of ellipse as the reflection film 17. Herein, the deformation film 16 may be formed of any deformable material other than a silicon substrate, without being limited to a silicon substrate.

On the other surface of the deformation film 16, a ring-shaped magnetic body 18 is laminated and fixed so as to warp the reflection film 17 into a parabolic state for reflecting a laser beam such that the reflected laser beam becomes in a state similar to the state before reflection. Incidentally, the ring-shaped magnetic body 18 may be laminated and fixed on the reflection film.

The ring-shaped magnetic body 18 is formed, using a magnetic material. Herein, as shown in FIG. 1, as a laser beam enters the reflection film 17 at an angle of 45 degrees, the ring-shaped magnetic body 18 is formed in a ring shape of an ellipse with a long axis in the laser beam travelling direction, similarly to the reflection film 17 and the deformation film 16, so that a laser beam having been reflected by the reflection film 17 comes to have a circular cross-section similar to that before reflection. It is desirable that the ring-shaped magnetic body 18 has a low stiffness so that the stiffness thereof does not inhibit the deformation film 16 from deforming.

The material of the ring-shaped magnetic body 18 may be, for example, a composite material for which magnetic powders are dispersed in a photoresist, and is not limited as long as the material is susceptible to receive a magnetic force from a magnetic field.

A ring structure having the reflection film 17 laminated on one surface of the deformation film 16 and the ring-shaped magnetic body 18 on the other surface of the deformation film 16, thus having a plurality of laminated layers of materials in such a manner, will be hereinafter referred to as a reflection body 17T (refer to FIG. 2A).

As shown in FIG. 2A, for the variable mirror actuator A1, the reflection body 17T is provided on an electromagnet D1 through a spacer 15 in a ring shape having an elliptical outer circumferential shape similar to that of the reflection film 17 and the deformation film 16.

The spacer 15 is desirably a non-magnetic body such as a resin, and may be formed integrally with the deformation film 16. The spacer 15 may be formed by a magnetic body as long as the performance of the variable mirror actuator A1 is not degraded.

The electromagnet D1 is provided with a yoke 14 of a magnetic body, and a coil 13 wound in plural turns around a yoke central portion 14c forming the central portion of the yoke 14.

The yoke 14 of the electromagnet D1 has the yoke central portion 14c being an elliptical column with a cross-section of an elliptical shape similar to the ring-shaped magnetic body 18, and a yoke peripheral portion 14s formed continuously with the lower outer circumference of the yoke central portion 14c. The yoke peripheral portion 14s has a cross-section along the axial direction in a C-shape opening inward and an outer circumferential shape in an elliptical shape similar to that of the reflection film 17 and the deformation film 16 (refer to FIG. 2B).

The yoke 14 is formed by an iron core of lamination of plural thin steel plates, ferrite, cobalt, or the like.

When a current is applied to the coil 13 of the electromagnet D1, the yoke 14 generates a strong magnetic field, and thus the variable mirror actuator A1 with this structure attracts the ring-shaped magnetic body 18 of the reflection body 17T to warp the deformation film 16 and the reflection film 17 into a parabolic shape as shown by the two-dot chain curve in FIG. 2A. In such a manner, by warping the reflection film 17 into a parabolic shape suitable for aberration correction, the divergence angle of a laser beam reflected by the reflection film 17 is controlled. Thus, the spherical aberration of a laser beam generated by a change in the position of the recording layer 11 from the position p1 of the recording layer 11a to the position p2 of the recording layer 11b, shown by FIG. 1, is corrected.

Herein, compared with a structure having only the yoke central portion 14c in a simple elliptical column shape formed inside the coil 13, the structure of the yoke 14, shown in FIG. 2A, continuously added with the yoke peripheral portion 14s in a coaxial elliptical shape in the region outside the outer circumference of the coil 13 is more desirable because the structure of the yoke 14, shown in FIG. 2A, causes a higher density of magnetic field lines around the coil 13 to make the magnetic force acting on the ring-shape magnetic body 18 stronger.

For example, as shown in FIG. 2A, by forming a yoke peripheral upper portion 14s1 at the yoke peripheral portion 14s with the C-shaped cross section, the magnetic field formed around the coil 13 comes to have a higher density, and thereby a stronger magnetic force can be applied to the ring-shaped magnetic body 18.

The yoke 14 may be, of course, formed only by the yoke central portion 14c.

Figure 22:
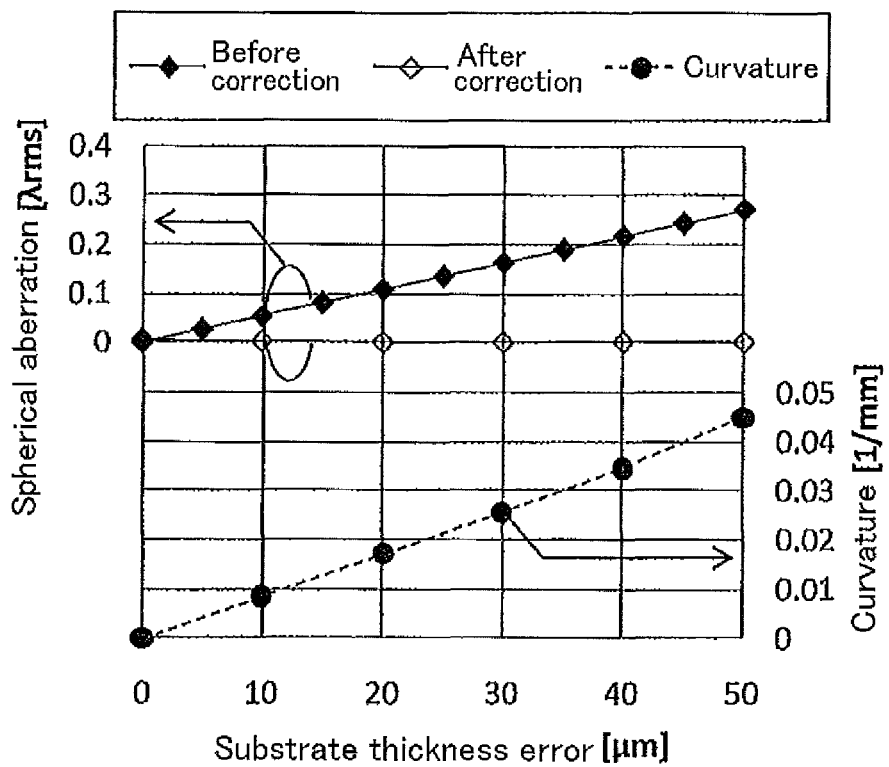
FIG. 22 is a diagram showing the relationship between the deformation amount of the variable-focus lens actuator and spherical aberration in the first embodiment.

FIG. 22 is a diagram showing an example of the relationship between the amount of deformation of the variable-focus lens actuator and the spherical aberration in the first embodiment. By changing the curvature of the deformation film 16, which is substantially flat in a state free from a substrate thickness error, to accompany the change in the substrate thickness, spherical aberration caused by a substrate thickness error can be almost cancelled. In this example, for a change in the substrate thickness of, for example, 50 µm, the spherical aberration having been caused to be approximately 300 mλrms can be almost corrected by deforming the curvature to 0.045 [1/mm].

Reading of Record from Recording Layer 31 of Optical Disc 32

Next, reading of a record (signal) by a laser beam from the recording layer 11 of the optical disc 12 mounted on the optical pickup P1 will be described, taking an example of reading a record from the recording layer 11b.

Incidentally, reading a record (signal) from the recording layer 11a is similar.

As shown in FIG. 1, in order to read a pit recorded on the recording layer 11b of the optical disc 12 as an electrical signal, a laser beam emitted from the laser light source 7 is collimated by the collimate lens 6, passed through the grating 5, and then reflected by the polarized light beam splitter 3 toward the variable mirror actuator A1. A part of the laser beam emitted from the laser light source 7 is passed through the polarized light beam splitter 3 and received by the front monitor 4 to monitor the light intensity of the laser light source 7.

Then, the laser beam reflected by the polarized light beam splitter 3 is reflected by the reflection film 17 of the variable mirror actuator A1, then passed through the ¼ wavelength plate 8 to be converted into a circular polarized light, focused on the recording film 11b by the objective lens 9, and reflected from the recording film 11b. The laser beam reflected by the recording film 11b is passed again through the objective lens 9 to be converted into a collimate light, then passed through the ¼ wavelength plate 8 to be converted into a linear polarized light, and reflected by the reflection film 17 of the variable mirror actuator A1 toward the polarized light beam splitter 3.

The laser beam reflected by the reflection film 17 is passed through the polarized light beam splitter 3, focused on the detector 1 by the condensing lens 2, and the light intensity entering the detector 1 is converted into an electrical signal.

Herein, in order to set the focus position of the laser beam by the objective lens 9 onto the recording layer 11 (11a or 11b) of the optical disc 12, a drive current is flown from a lens drive circuit C2 to the lens actuator 10, based on a signal indicating the movement amount of the objective lens calculated by a control circuit C1, wherein the calculation is performed based on information on the laser beam received by the detector 1. In such a manner, the lens actuator 10 translates or rotates the objective lens 9 in the direction of the optical axis or the direction perpendicular to the optical axis, relative to the recording layer 11 of the optical disk 12.

A current is applied to the coil 13 of the variable mirror actuator A1 from a mirror drive circuit C3, based on a signal indicating the warp amount of the reflection film 17 calculated by the control circuit C1, wherein the calculation is performed based on information on the laser beam received by the detector 1.

Thus, the variable mirror actuator A1 generates a strong magnetic field at the central portion of the yoke 14 by the current flowing in the coil 13, and thereby attracts the ring-shaped magnetic body 18 of the reflection body 17T toward the electromagnet D1 as shown by the two-dot chain curve in FIG. 2A. Consequently, the deformation film 16 and the reflection film 17 of the reflection body 17T supported by the electromagnet D1 through the spacer 15 warp into a parabolic shape.

In such a manner, the reflection film 17 is warped into a desired parabolic shape by flowing a current in the coil 13 of the variable mirror actuator A1; the divergence angle of the laser beam reflected by the reflection film 17 is controlled by the magnitude of the current flowing in the coil 13; and thus the spherical aberration of the laser beam caused by a change in the position of the recording layer 11 between the position P1 (recording layer 11a) and the position P2 (recording layer 11b) is corrected.

Second Embodiment

Next, a variable mirror actuator A2 in a second embodiment will be described, referring to FIGS. 3 and 4.

FIG. 3 is a diagram showing an example of an outline of an optical system of an optical pickup P2 incorporating the variable mirror actuator A2 in the second embodiment.

Figure 4A:
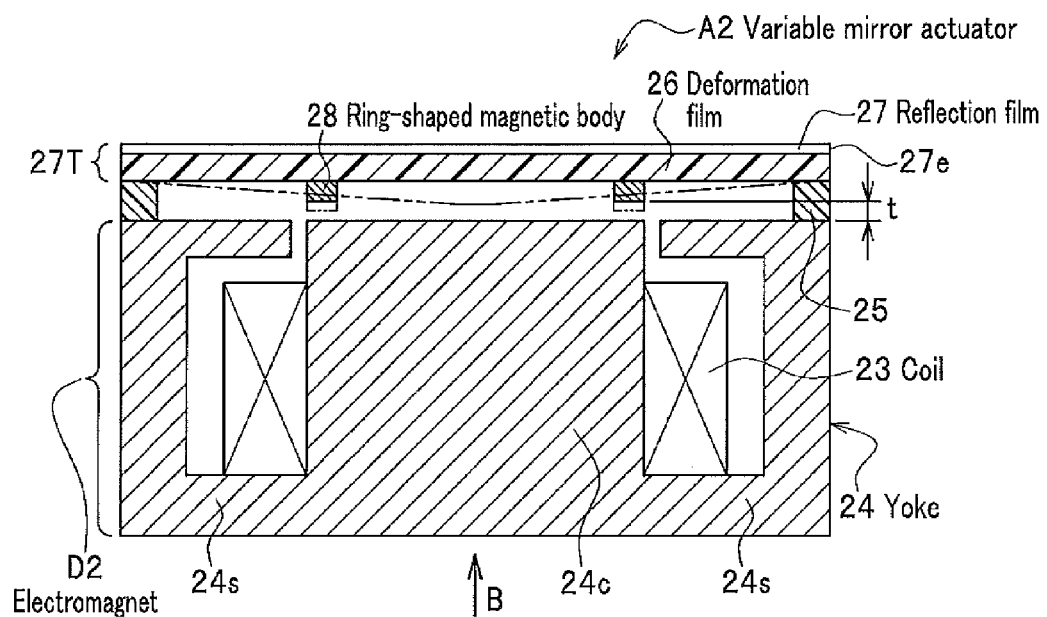
FIG. 4A is a vertical cross-sectional view of the variable mirror actuator, shown as an example, with respect to the axial direction in the second embodiment.
Figure 4B:
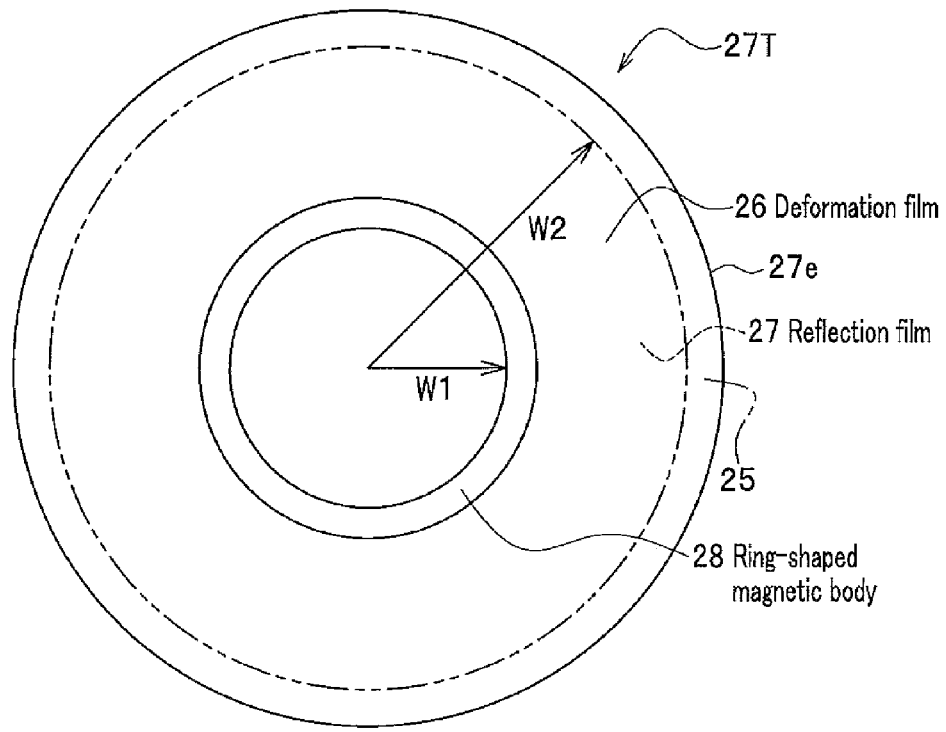
FIG. 4B is a diagram of a view, from direction B in FIG. 4A, of a deformation film formed integrally with a reflection film, and a ring-shaped magnetic body fixed on the deformation film.

FIG. 4A is a vertical cross-sectional view along the axial direction showing an example of the variable mirror actuator A2 in the second embodiment. FIG. 4B is a view, from direction B in FIG. 4A, of a deformation film 26 formed integrally with a reflection film 27 of the variable mirror actuator A2 and a ring-shaped magnetic body 28 fixed on the deformation film 26.

The optical pickup P2, shown in FIG. 3, in the second embodiment has a basic structure similar to that of the optical pickup P1 (refer to FIG. 1) in the first embodiment, however, the second embodiment is different in that the disposition of the variable mirror actuator A1 in the first embodiment is changed for the variable mirror actuator A2 to which a laser beam perpendicularly enters. Accordingly, the variable mirror actuator A2 is arranged to have different structure from that of the variable mirror actuator A1 in the first embodiment.

In other aspects, the structure of the variable mirror actuator A2 is similar to that of the variable mirror actuator A1 in the first embodiment, and detailed description will be omitted.

In FIGS. 3 and 4, symbols in the 20s are assigned to respective structural elements of the variable mirror actuator A2.

The structure of the optical pickup P2 in the second embodiment will be described below, focusing on differences from the structure in the first embodiment.

The optical pickup P2 in the second embodiment is different from the optical system, shown in FIG. 1, in the first embodiment in the optical system that is disposed between the grating 5 and the objective lens 9.

In the optical pickup P2, shown in FIG. 3, a laser beam emitted from a laser light source 7, a part of the laser beam being reflected by a beam splitter 19, passes through a polarized light beam splitter 3, and passes through a ¼ wavelength plate 8 to be converted into a circular polarized light. This laser beam having passed the ¼ wavelength plate 8 is reflected by a reflection film 27 of the variable mirror actuator A2, and again passed through the ¼ wavelength plate 8 to be converted into a linear polarized light, and then reflected by the polarized light beam splitter 3 toward the recording layer 11 of an optical disk 12.

The laser beam having been reflected by the polarized light beam splitter 3 is passed through the objective lens 9 to be focused, and then reflected by a recording film 11 (11a or 11b). The reflected beam is again passed through the objective lens 9 to be made parallel light, reflected by the polarized light beam splitter 3, and passed through the ¼ wavelength plate 8 to be converted into a circular polarized light. Then, the laser beam reflected again by the reflection film 27 of the variable mirror actuator A2 is passed through the ¼ wavelength plate 8 to be converted into a linear polarized light, further passed through the polarized light beam splitter 3, projected toward the beam splitter 19, and partially passed through the beam splitter 19 to be focused by a condensing lens 2 onto a detector 1.

In the optical system of the optical pickup P2, a laser beam perpendicularly enters and reflects from the reflection mirror 27 of the A2. Accordingly, the laser beam projected to the reflection mirror 27 becomes circular.

Therefore, the variable mirror actuator A2 in the second embodiment is formed in a cylindrical shape, while the variable mirror actuator A1 in the first embodiment has an elliptical column shape. In other aspects, the structure of the A2 is similar to that of the variable mirror actuator A1 in the first embodiment.

As shown in FIG. 4, for the variable mirror actuator A2 in the second embodiment, the reflection film 27 is formed in a circular flat-plate shape, and the deformation film 26 is formed in the same circular flat-plate shape. The ring-shaped magnetic body 28 fixed on the deformation film 26 is formed in a circular ring shape. Thus, as shown in FIG. 4B, a reflection body 27T is formed in a circular flat-plate shape.

As shown in FIG. 4A, the reflection body 27T is arranged on the cylindrical electromagnet D2 through a spacer 25 in a circular ring-shape having the same outer circumferential shape as that of the deformation film 26 and the reflection film.

The electromagnet D2 is provided with a yoke 24 in a substantially cylindrical shape. The yoke 24 has a yoke central portion 24c in a cylindrical shape similar to the shape of the rig-shaped magnetic body 28 and a yoke peripheral portion 24s of a magnetic body with a cross-section in the axial direction in a C-shape opening inward, wherein the yoke peripheral portion 24s is formed continuously with the lower outer circumference of the yoke central portion 24c.

A coil 23 is wound in plural turns around the cylindrical yoke central portion 24c of the yoke 24 of the electromagnet D2.

The dimension t in FIG. 4A indicates the dimension of the gap between the ring-shaped magnetic body 28 and the yoke 24. The dimension W1 in FIG. 4B indicates the dimension of the inner radius of the circular ring-shaped magnetic body 28. The dimension W2 in FIG. 4B indicates the dimension of the inner radius of the spacer 25 in a circular ring-shape.

Making a difference from the reflection film 17 of the elliptical mirror in FIG. 2 used for the variable mirror actuator A1 in the first embodiment, the reflection film 27 can be formed in a circular shape and the mirror size can be made smaller for the variable mirror actuator A2 in the second embodiment.

Further, the variable mirror actuator A2 can be produced to be cylindrical, which enables easy manufacturing. Still further, control by the control circuit C1 for deformation of the reflection film 27 and the mirror drive circuit C3 can be made easy. The ring-shaped magnetic body 28 may be fixed in lamination on the reflection film.

Third Embodiment

Next, a variable mirror actuator A3 in a third embodiment will be described, referring to FIG. 5.

Figure 5:
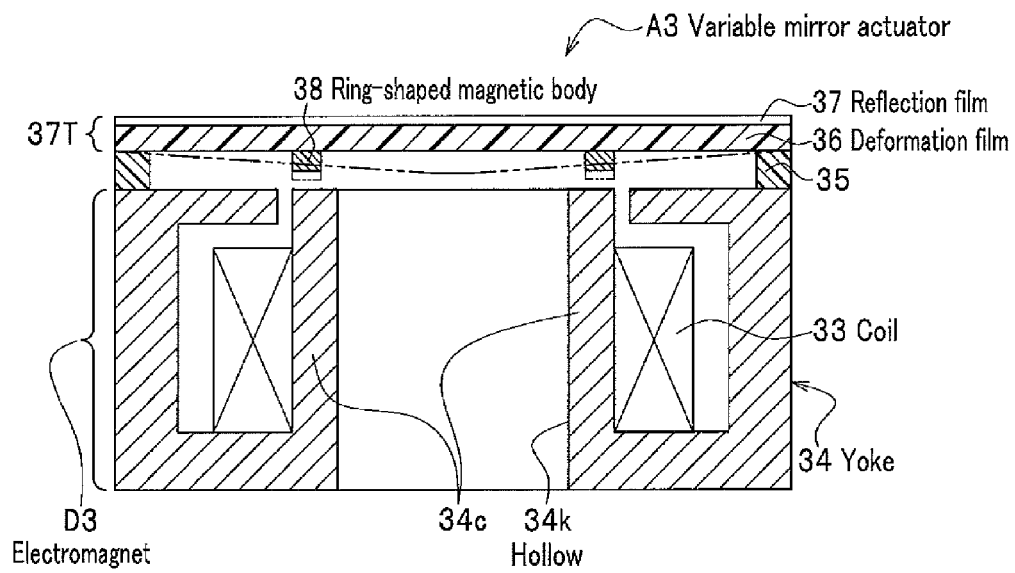
FIG. 5 is a vertical cross-sectional view of a variable mirror actuator, shown as an example, with respect to the axial direction in a third embodiment.

FIG. 5 is a vertical cross-sectional view in the axial direction, showing an example of the variable mirror actuator A3 in the third embodiment.

An optical pickup in the third embodiment has a basic structure similar to those of the optical pickups P1 and P2 (refer to FIGS. 1 and 3) in the first and second embodiments, however, the shape of a yoke is different shape from the shapes of the yoke 14 (refer to FIG. 2A) and the yoke 24 (refer to FIG. 4A) of the variable mirror actuators A1 and A2 in the first and second embodiments.

In other aspects, the structure of the variable mirror actuator A3 is similar to those of the variable mirror actuators A1, A2 in the first and second embodiments, and detailed description will be omitted.

In FIG. 5, symbols in the 30s are assigned to respective structural elements of the variable mirror actuator A3.

The difference in structure from those of the yokes 12, 24 of the variable mirror actuators A1, A2 in the first and second embodiments will be described below.

For the variable mirror actuator A3 in the third embodiment, shown in FIG. 5, when a yoke 34 has an elliptical column shape similar to the yoke 14 (refer to FIGS. 2A and 2B) in the first embodiment, the central portion of the yoke 34 on the inner radius side of the coil 33 is formed as a hollow 34k in an elliptical column shape.

On the other hand, when the yoke 34 has a cylindrical shape similar to that of the yoke 24 (refer to FIGS. 4A and 4B) in the second embodiment, the central portion of the yoke 34 on the inner radius side of the coil 33 is formed as a hollow 34k in a cylindrical column shape.

With this structure, the magnetic flux flowing in the yoke 34 on the inner radius side of the coil 33 concentrates more on the yoke central portion 34c on the inner side of the coil 33, resulting in a high density of the magnetic flux flowing through the ring-shape magnetic body 38. Accordingly, an advantage is obtained that the attractive force by the electromagnet D3 acting on the ring-shaped magnetic body 38 is improved.

Fourth Embodiment

Next, a variable mirror actuator A4 in a fourth embodiment will be described, referring to FIG. 6.

Figure 6:
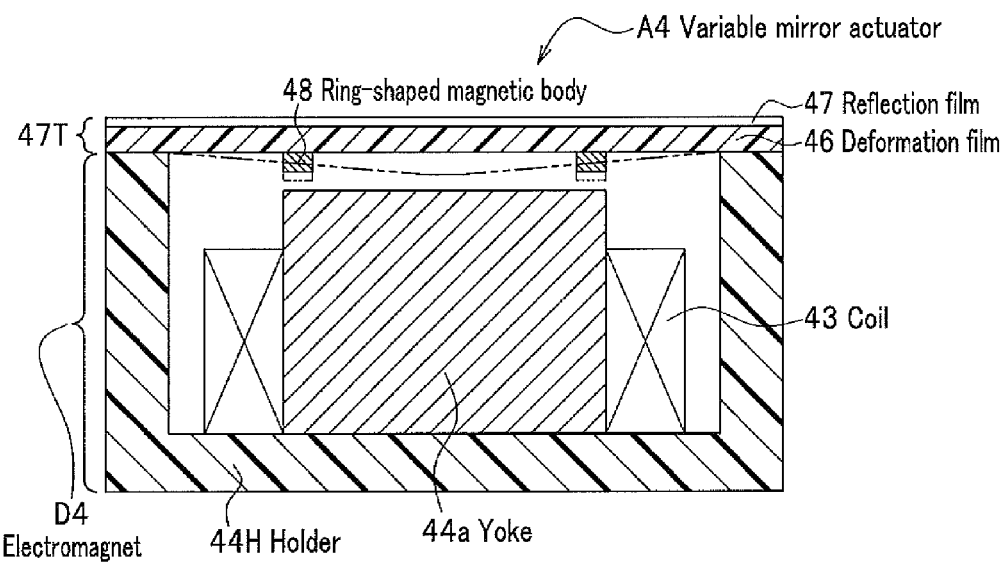
FIG. 6 is a vertical cross-sectional view of a variable mirror actuator, shown as an example, with respect to the axial direction in a fourth embodiment.

FIG. 6 is a vertical cross-sectional view in the axial direction, showing an example of the variable mirror actuator A4 in the fourth embodiment.

The basic structure of an optical pickup in the fourth embodiment is similar to those of the optical pickups P1, P2 (refer to FIGS. 1 and 3) in the first and second embodiments, however, the shape of a yoke 44a of the variable mirror actuator A4 is different from those of the yokes 14, 24 (refer to FIG. 2A and FIG. 4A) of the variable mirror actuators A1 and A2 in the first and second embodiments.

In other aspects, the structure of the variable mirror actuator A4 is similar to those of the variable mirror actuators A1, A2 in the first and second embodiments, and detailed description will be omitted.

In FIG. 6, symbols in the 40s are assigned to respective structural elements of the variable mirror actuator A4.

The difference in structure from those of the yokes 12, 24 of the variable mirror actuators A1, A2 in the first and second embodiments will be described below.

The variable mirror actuator A4 in the fourth embodiment has a yoke 44a taking the place of the yokes 14, 24 in an elliptical column shape or a cylindrical shape in the first and second embodiments. The yoke 44a is formed by a magnetic body of an iron core, ferrite, or the like inside the inner circumference of a coil 43, and on the other hand, has an outer circumferential portion formed by a holder 44H of a structure of a different material, such as resin, for example.

Herein, the holder 44H being a structure different from the yoke 44a is formed integrally with a structure corresponding to the spacers 15, 25 (refer to FIG. 2A, FIG. 4A) in the first and second embodiments.

Thus, the yokes 12, 24 of the variable mirror actuators A1, A2 in the first and second embodiments can be changed to the structures of the yoke 44a and the holder 44H.

Further, using a material, which is easy in machining, for the holder 44H, easy machining can be realized.

Still further, it is possible to form the holder 44H integrally with the base member, which is the resin base support member of the optical pick up, and thereby the suitability for an optical system is improved.

Fifth Embodiment

Next, a variable mirror actuator in a fifth embodiment will be described below, referring to FIGS. 7A and 7B.

Figure 7A:
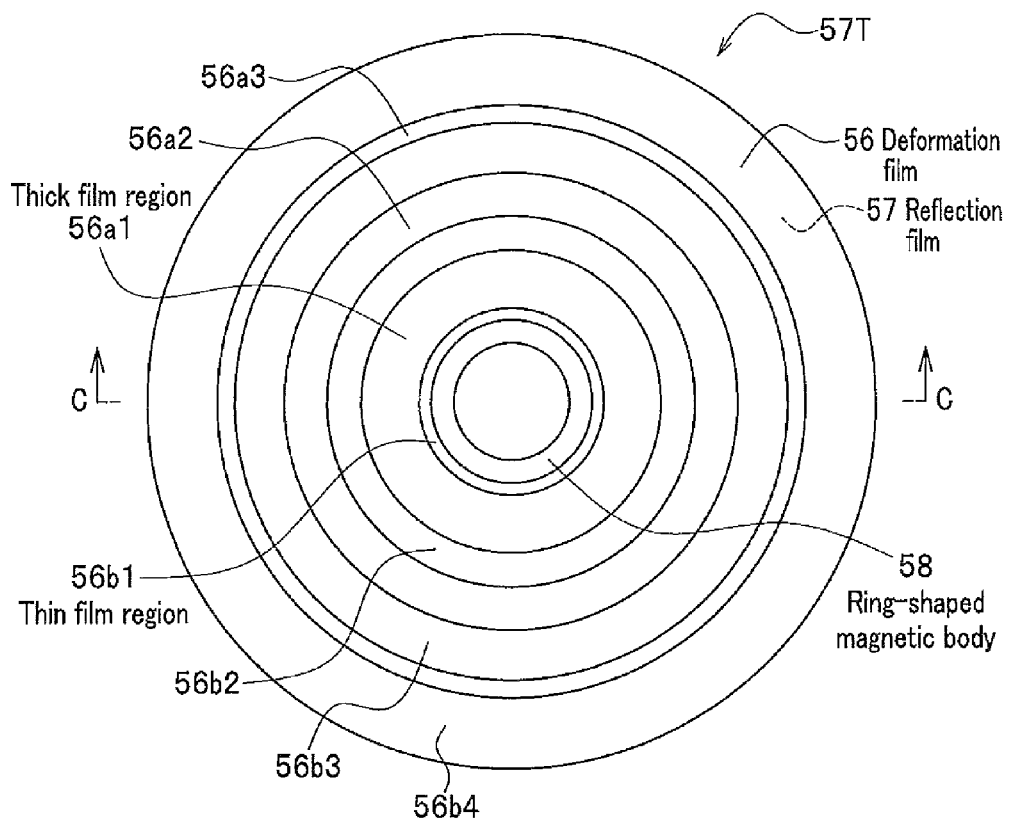
FIG. 7A is a bottom surface view showing a reflection body having a ring-shaped magnetic body, a deformation film, and a reflection film, of a variable mirror actuator in a fifth embodiment.

FIG. 7A is a bottom surface view (corresponding to an arrow view in direction A of FIG. 2A) showing a reflection body 57T of a variable mirror actuator in a fifth embodiment, the reflection body 57T having a ring-shaped magnetic body 58, a deformation film 56, and a reflection film 57. FIG. 7B is a cross-sectional view with respect to line C-C in FIG. 7A.

Figure 7B:
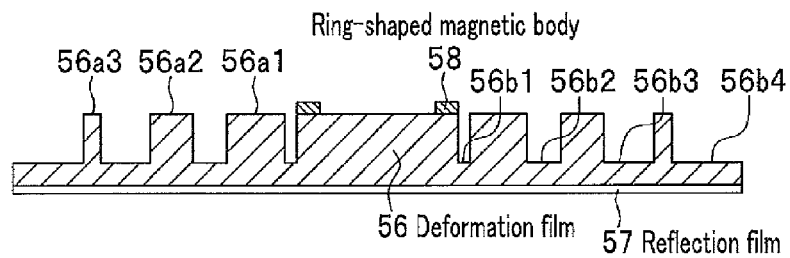
FIG. 7B is a cross-sectional view with respect to line C-C in FIG. 7A.

The basic structure of an optical pickup in the fifth embodiment is similar to those of the optical pickups P1, P2 (refer to FIGS. 1 and 3) in the first and second embodiments, however, the shape of the deformation film 56, shown in FIGS. 7A and 7B, of the variable mirror actuator is different from those of the deformation films 16, 26 (refer to FIG. 2A and FIG. 4A) of the variable mirror actuators A1 and A2 in the first and second embodiments.

In other aspects, the structure of the variable mirror actuator is similar to those of the variable mirror actuators A1, A2 in the first and second embodiments, and detailed description will be omitted.

In FIGS. 7A and 7B, symbols in the 50s are assigned to respective structural elements of the reflection body 57T of the variable mirror actuator.

The difference in structure from those of the deformation films 16, 26 of the variable mirror actuators A1, A2 in the first and second embodiments will be described below.

Instead of the deformation films 16, 26 with a single film thickness in the first and second embodiments, a deformation film 56, shown in FIGS. 7A and 7B, of the variable mirror actuator in the fifth embodiment is formed such that regions 56a (56a1, 56a2, 56a3) with a large film thickness and regions 56b (56b1, 56b2, 56b3, 56b4) with a small film thickness are concentrically, alternately, and periodically arranged in the region outside the outer circumference of the ring-shaped magnetic body 58.

With regard to the ratio of a thick region 56a to a thin region 56b of the deformation film 56 within each period, the ratio of a thick film region 56a decreases as the region is farther from the center of the mirror, namely farther from the center of the reflection film 57. Accordingly, the effective stiffness of the reflection body 57T forming the mirror decreases with the distance from the center of the mirror (the center of the reflection film 57).

Consequently, by optimizing the ratio of a thick film region 56a to a thin film region 56b within each period, the reflection body 57T can be deformed into an ideal parabolic shape with a magnetic force acting on the ring-shaped magnetic body 58.

In the fifth embodiment, description has been made, taking an example of a reflection body 57T having a ring-shaped magnetic body 58, a deformation film 56, and a reflection film 57 in a circular form, however, the above-described structure is, of course, applicable likewise also to a reflection body 17T having a ring-shaped magnetic body 18, a deformation film 16, and a reflection film 17 in an elliptical shape, as in the case of the variable mirror actuator A1 (refer to FIG. 2B) in the first embodiment.

Further, the ring-shaped magnetic body 58 may be fixed in lamination on the reflection film.

Sixth Embodiment

Next, a variable mirror actuator in accordance with a sixth embodiment will be described, referring to FIGS. 8A to 8C.

Figure 8A:
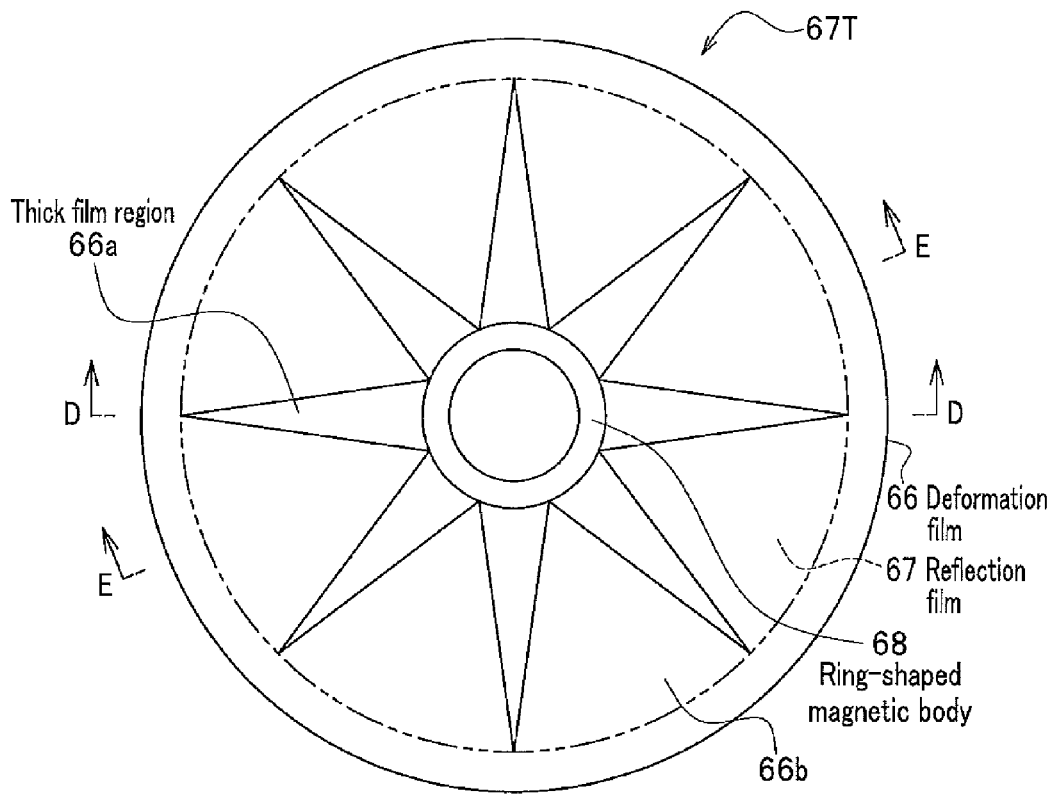
FIG. 8A is a bottom surface view showing a ring-shaped magnetic body, a deformation film, and a reflection body having a reflection film, of a variable mirror actuator in a sixth embodiment.

FIG. 8A is a bottom surface view (corresponding to an arrow view in direction A of FIG. 2A) showing a reflection body 67T having a ring-shaped magnetic body 68, a deformation film 66, and a reflection film 67, of a variable mirror actuator in a sixth embodiment. FIG. 8B is a cross-sectional view with respect to line D-D in FIG. 8A. FIG. 8C is a cross-sectional view with respect to line E-E in FIG. 8A The basic structure of an optical pickup in the sixth embodiment is similar to those of the optical pickups P1, P2 (refer to FIGS. 1 and 3) in the first and second embodiments, however, the shape of a deformation film 66, shown in FIGS. 8A and 8B, of the variable mirror actuator is different from those of the deformation films 16, 26 (refer to FIG. 2A and FIG. 4A) of the variable mirror actuators A1 and A2 in the first and second embodiments.

In other aspects, the structure of the variable mirror actuator is similar to those of the variable mirror actuators A1, A2 in the first and second embodiments, and detailed description will be omitted.

Figure 8B:
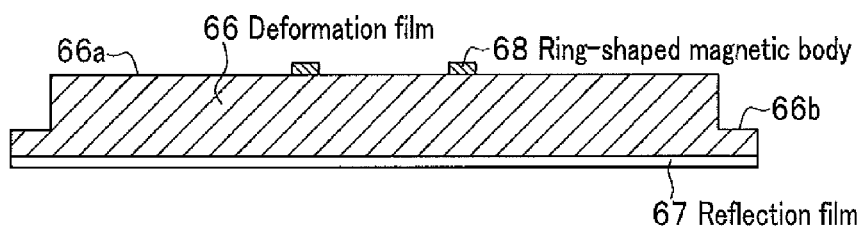
FIG. 8B is a cross-sectional view with respect to line D-D in FIG. 8A.

In FIGS. 8A and 8B, symbols in the 60s are assigned to respective structural elements of the reflection body 67T of the variable mirror actuator.

The difference in structure from those of the deformation films 16, 26 of the variable mirror actuators A1, A2 in the first and second embodiments will be described below.

Figure 8C:
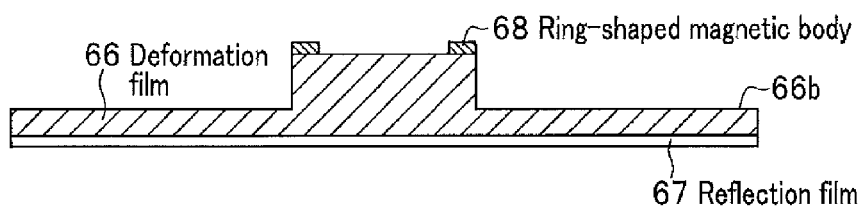
FIG. 8C is a cross-sectional view with respect to line E-E in FIG. 8A.

The deformation film 66 of the variable mirror actuator, shown in FIGS. 8A to 8C, in the sixth embodiment is different in structure from the deformation films 16, 26 (refer to FIGS. 2A and 4A) with a single film thickness in the first and second embodiments. The deformation film 66 has a structure in which thick film regions 66a radially extend between thin film regions 66b in a region outside the outer circumference of a ring-shaped magnetic body 68. A portion of each thick film region 66a becomes wider as the portion is closer to the central portion of the deformation film 66, and becomes narrower as the portion is closer to the outer circumference of the deformation film 66.

Thus, the effective stiffness of the reflection body 67T forming the mirror decreases with the distance from the center of the mirror (the center of the reflection film 67).

Consequently, by optimizing the structure in which the thick film regions 66a of the deformation film 66 radially extend, the reflection body 67T can be deformed into an ideal parabolic shape with a magnetic force acting on the ring-shaped magnetic body 68.

In the sixth embodiment, description has been made, taking an example of a reflection body 67T having a ring-shaped magnetic body 68, a deformation film 66, and a reflection film 67 in a circular shape, however, the above-described structure is, of course, applicable likewise also to a reflection body 17T having a ring-shaped magnetic body 18, a deformation film 16, and a reflection film 17 in an elliptical shape, as in the case of the variable mirror actuator A1 (refer to FIG. 2B) in the first embodiment.

Seventh Embodiment

Next, a variable mirror actuator A7 in a seventh embodiment will be described, referring to FIGS. 9A and 9B.

Figure 9A:
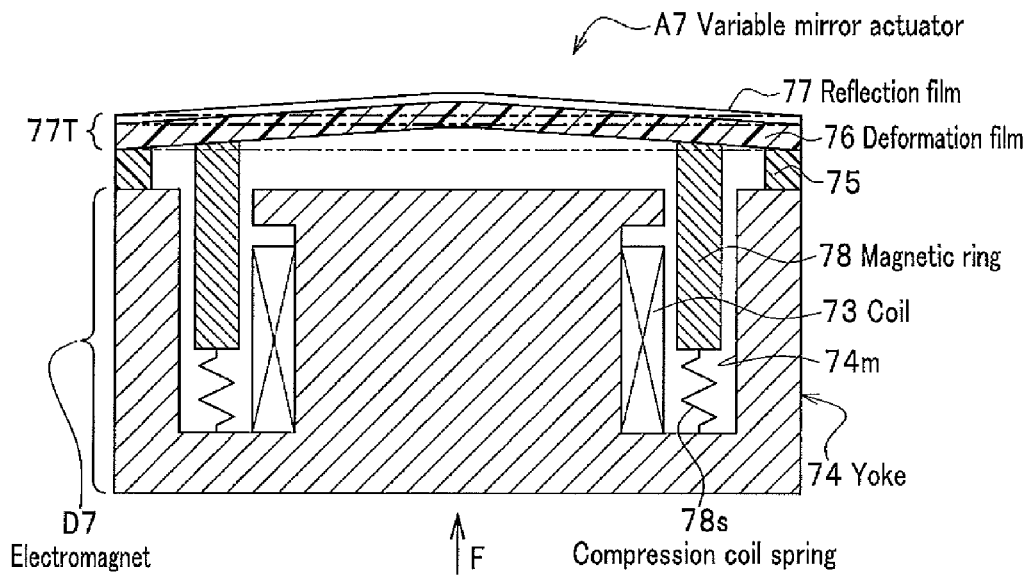
FIG. 9A is a vertical cross-sectional view of a variable mirror actuator, shown as an example, with respect to the axial direction in a seventh embodiment.

FIG. 9A is a vertical cross-sectional view of the variable mirror actuator A7 in the seventh embodiment. FIG. 9B is a view of a deformation film 76 formed integrally with a reflection film 77 of the variable mirror actuator A7, viewed from direction F in FIG. 9A;

The basic structure of an optical pickup in the seventh embodiment is similar to those of the optical pickups P1, P2 (refer to FIGS. 1 and 3) in the first and second embodiments, however, the variable mirror actuator A7, shown in FIG. 9A, has a ring-shaped magnetic body having a different shape from those of the ring-shape magnetic bodies 18, 28 (refer to FIG. 2A, FIG. 4A) of the variable mirror actuators A1, A2 in the first and second embodiments and a different mirror deformation principle from that of the reflection bodies 17T, 27T.

In other aspects, the structure of the variable mirror actuator A7 is similar to those of the variable mirror actuators A1, A2 in the first and second embodiments, and detailed description will be omitted.

A structure, which is based on a deformation principle different from the deformation principle (the deformation principle of the reflection bodies 17T, 27T) of the ring-shaped magnetic bodies 18, 28 and the mirrors of the variable mirror actuators A1, A2 in the first and second embodiments, will be described below.

Figure 9B:
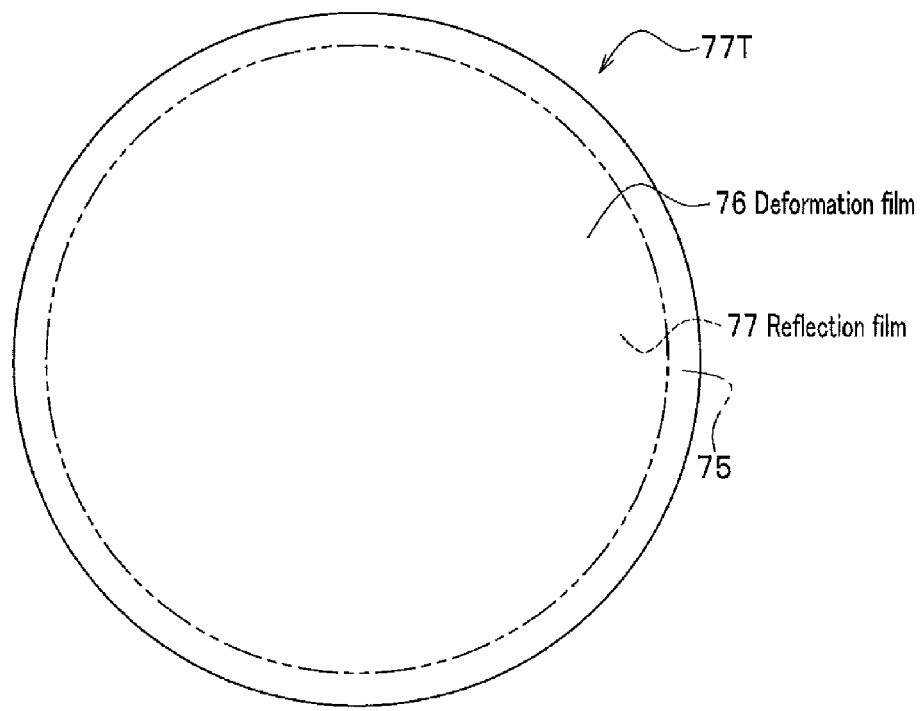
FIG. 9B is a view of a deformation film formed integrally with a reflection film, viewed from direction F in FIG. 9A.

In FIGS. 9A and 9B, symbols in the 70s are assigned to respective structural elements of the variable mirror actuator A7.

The variable mirror actuator A7 in the seventh embodiment has a structure where a magnetic ring 78 corresponding to the ring-shaped magnetic body 18, shown in FIG. 2, for example, is not fixed on a deformation film 76.

As shown in FIG. 9A, in a short cylindrical recessed portion 74m formed on a yoke 74 of an electromagnet D7 and around a coil 73, a structure is disposed, the structure having a magnetic ring 78 in a short cylindrical tube shape with a large thickness and a compression coil springs 78s pressing the magnetic ring 78 upward.

With this structure, during a stationary state when no current is applied to the coil 73 of the electromagnet D7, the short cylindrical magnetic ring 78 is pressed upward by the compression coil springs 78s to be pushed out upward (upward in FIG. 9A), thereby deforming the deformation film 76 and the reflection film 77 substantially into a parabolic shape (refer to the solid curves in FIG. 9A).

From this stationary state, when a current is applied to the coil 73 of the electromagnet D7, a magnetic field generated through the yoke 74 around the coil 73 passes through the magnetic ring 78, and the magnetic ring 78 is pulled in toward the electromagnet D7. Thereby, the upward pressing force by the magnetic ring 78 is reduced. Thus, the deformation film 76 and the reflection film 77 return to the shape substantially being a flat plate shape (refer to the two-dot chain lines in FIG. 9A).

On the other hand, when the applied current to the coil 73 is reduced; the magnetic field generated through the yoke 74 around the coil 73 decreases; thereby the magnetic force received by the magnetic ring 78 toward the electromagnet D7 decreases and the magnetic ring 78 receives an upward elastic force by the compression coil springs 78s; and the magnetic ring 78 pushes out the deformation film 76 and the reflection film 77 upward (upward in FIG. 9A).

In such a manner, by the elastic force of the compression coil springs 78s, the ring-shaped magnetic ring 78 comes in ring-shape contact with the deformation film 76, and by driving the variable mirror actuator A7 and applying a current to the coil 73 of the electromagnet D7, the deformation film 76 can be warped as desired similarly to the first embodiment. Thus, the reflection film 77 can be made into a desired parabolic shape.

In the seventh embodiment, description has been made, taking an example of case where the variable mirror actuator A7 has a cylindrical shape, however, the above-described structure is, of course, applicable likewise also to a case of an elliptical column shape (refer to FIG. 2B) as in the first embodiment.

Eighth Embodiment

Next, a variable mirror actuator A8 in an eighth embodiment will be described below, referring to FIGS. 10A and 10B.

Figure 10A:
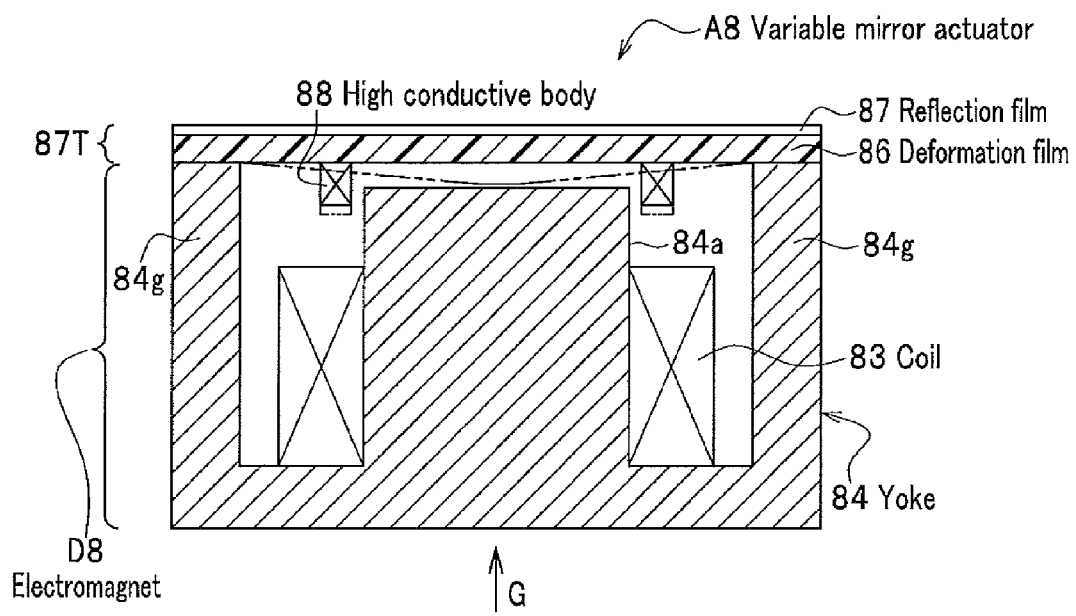
FIG. 10A is a vertical cross-sectional view of a variable mirror actuator, shown as an example, with respect to the axial direction in an eighth embodiment.

FIG. 10A is a vertical cross-sectional view in the axial direction, showing an example of a structure of the variable mirror actuator A8 in the eighth embodiment. FIG. 10B is a view, from direction G in FIG. 10A, of a deformation film 86 formed integrally with a reflection film 87 of the variable mirror actuator A8 and a high-conductive body 88 in a ring shape fixed on the deformation film 86.

The basic structure of an optical pickup, shown in FIG. 10A, in the eighth embodiment is similar to those of the optical pickups P1, P2 (refer to FIGS. 1 and 3) in the first and second embodiments.

The variable mirror actuator A8 in the eighth embodiment has a basic structure similar to those of the variable mirror actuators A1, A2 in the first and second embodiments, however, the variable mirror actuator A8 is different in the mirror drive principle from the variable mirror actuators A1, A2 and the reflection films 17, 27 as mirrors thereof in the first and second embodiments.

In other aspects, the structure of the variable mirror actuator A8 is similar to those of the variable mirror actuators A1, A2 in the first and second embodiments, and detailed description will be omitted.

Figure 10B:
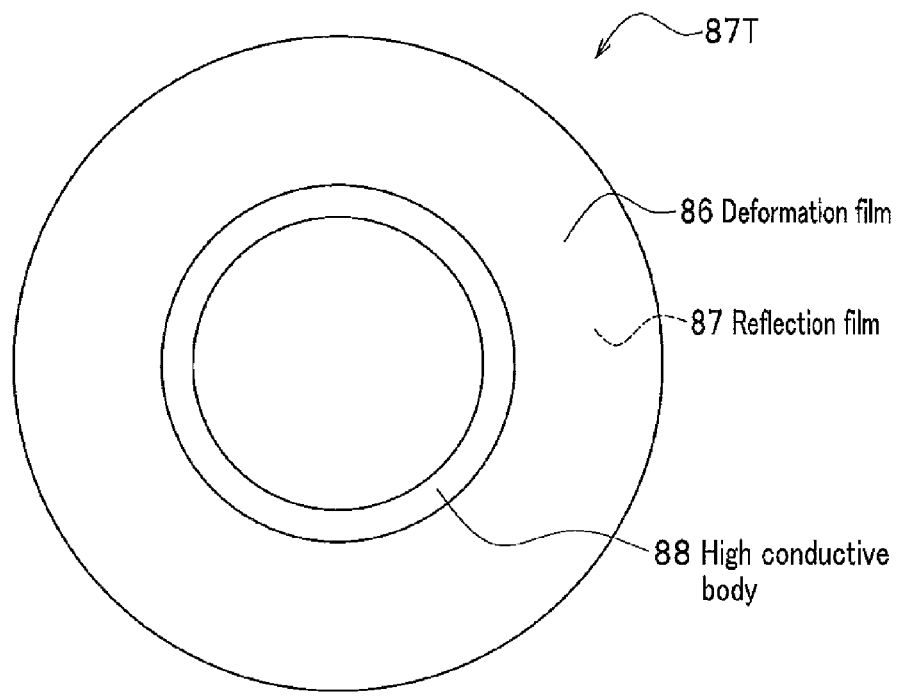
FIG. 10B is a view of a deformation film formed integrally with a reflection film, and a ring-shaped magnetic body fixed on the deformation film, viewed from direction G in FIG. 10A.

In FIGS. 10A and 10B, symbols in the 80s are assigned to respective structural elements of the variable mirror actuator A8.

The difference of the structure of the variable mirror actuator A8, in the eighth embodiment, from the variable mirror actuators A1, A2, in the first and second embodiments, with reflection films 17, 27 as the mirrors thereof, will be described, wherein the difference is in the driving principle of a mirror.

For the variable mirror actuator A8 in the eighth embodiment, instead of a ring-shaped magnetic body to be fixed on the deformation film 86 integrated with the reflection film 87, for example, a high-conductive body 88 (refer to FIG. 10B) is provided. The ring-shaped high-conductive body 88 is disposed in a region outside the outer circumferential surface 84a of a yoke 84 facing the inner circumference of a coil 83 of an electromagnet D8.

Further, a ring-shaped spacer described as an example in the first and second embodiments is not used between the reflection body 87T and the yoke 84, and a yoke outer circumferential portion 84g is formed to extend up to the spacer region, and the reflection body 87T is fixed on the yoke outer circumferential portion 84g.

In the variable mirror actuator A8 with this structure, by applying a drive current to the coil 83 of the electromagnet D8 to change the magnetic flux in the yoke 84 by electromagnetic induction, a change in the magnetic flux is caused, wherein the magnetic flux passes inside the ring of the ring-shaped high conductive body 88 which is shown in FIG. 10B and disposed outside the outer circumferential surface 84a of the yoke 84. Accompanying this, an induction current is induced in the ring-shaped high conductive body 88 in the ring circumferential direction, thereby, a magnetic field cancelling the magnetic flux passing inside the ring of the high conductive body 88 is generated, and thus a counter force to the magnetic field generated from the coil 83 acts on the ring-shaped high conductive body 88.

Thus, similarly to the first and second embodiments, the deformation film 86 can be warped into an appropriate parabolic shape.

The drive waveform of the current applied to the coil 83 does not cause a change in the magnetic field if the current is constant, and no force acts on the high conductive body 88. Further, a current drive of a linear sin curve cancels the force acting on the high conductive body 88 to cause a phenomenon inhibiting the high conductive body 88 from moving.

Therefore, the current applied to the coil 83 desirably has a temporally non-linear drive waveform, such as a triangle wave or a half sine wave, which allows the high conductive body 88 to appropriately move.

In the eighth embodiment, description has been made, taking an example of a case where the variable mirror actuator A8 is in a cylindrical shape, however, the structure is, of course, similarly applicable also to a case of an elliptical column shape as in the first embodiment.

Ninth Embodiment

Next, a variable mirror actuator in accordance with a ninth embodiment will be described below, referring to FIG. 11, etc.

Figure 11:
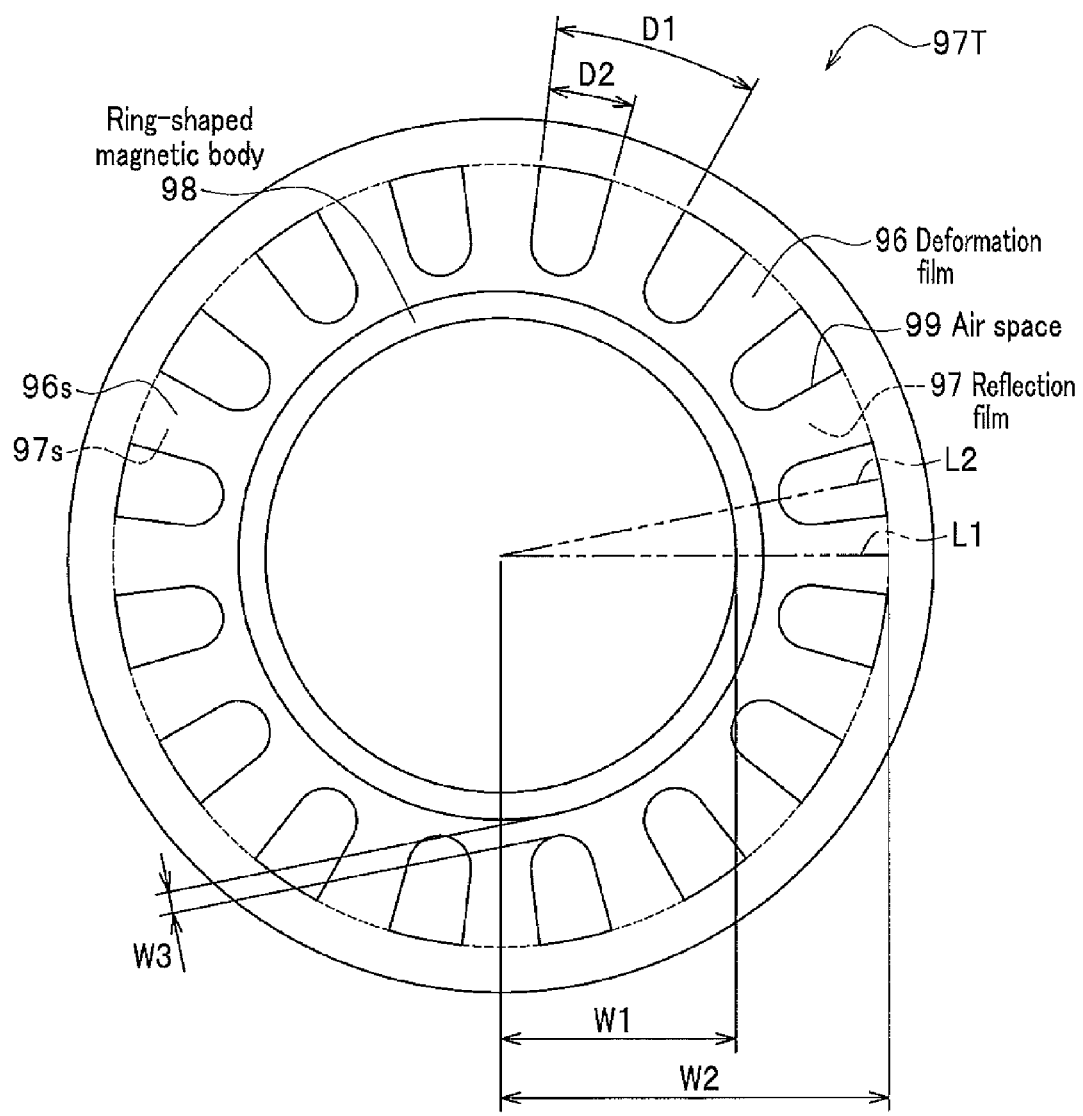
FIG. 11 is a bottom surface view showing a ring-shaped magnetic body, a deformation film, and a reflection body having a reflection film, of a variable mirror actuator in a ninth embodiment.

FIG. 11 is a bottom surface view (corresponding to an arrow view in direction A of FIG. 2A) showing a reflection body 97T having a ring-shaped magnetic body 98, a deformation film 96, and a reflection film 97, of a variable mirror actuator in a ninth embodiment.

The optical pickup (not shown) in the ninth embodiment has a basic structure similar to those of the optical pickups P1, P2 (refer to FIGS. 1 and 3) in the first and second embodiments.

A reflection body 97T of the variable mirror actuator in the ninth embodiment has a different shape from those of the mirrors (the shapes of the reflection bodies 17T, 27T) of the variable mirror actuators A1, A2 in the first and second embodiments.

In other aspects, the structure of the variable mirror actuator is similar to those of the variable mirror actuators A1, A2 in the first and second embodiments, and detailed description will be omitted.

In FIG. 11, symbols in the 90s are assigned to respective structural elements of the reflection body 97T.

A structure different from those of the reflection bodies 17T, 27T of the variable mirror actuators A1, A2 in the first and second embodiments will be described below.

For the reflection body 27T being a variable mirror in the above-described second embodiment, a ring-shaped magnetic body 28 is fixed on the lamination of the reflection film 27 and the deformation film 26 in a circular shape and of a single film thickness, as shown in FIG. 4A. By the magnetic field generated by the coil 23 and the yoke 24 disposed below the reflection body 27T being a variable mirror, an attractive force acts on the ring-shaped magnetic body 28 toward the yoke 24, and the displacement amounts of the mirror at respective distances from the center (the center of the reflection film 27) of the reflection body 27T forming the mirror at this moment are represented by the solid curve L3 in FIG. 12.

Figure 12:
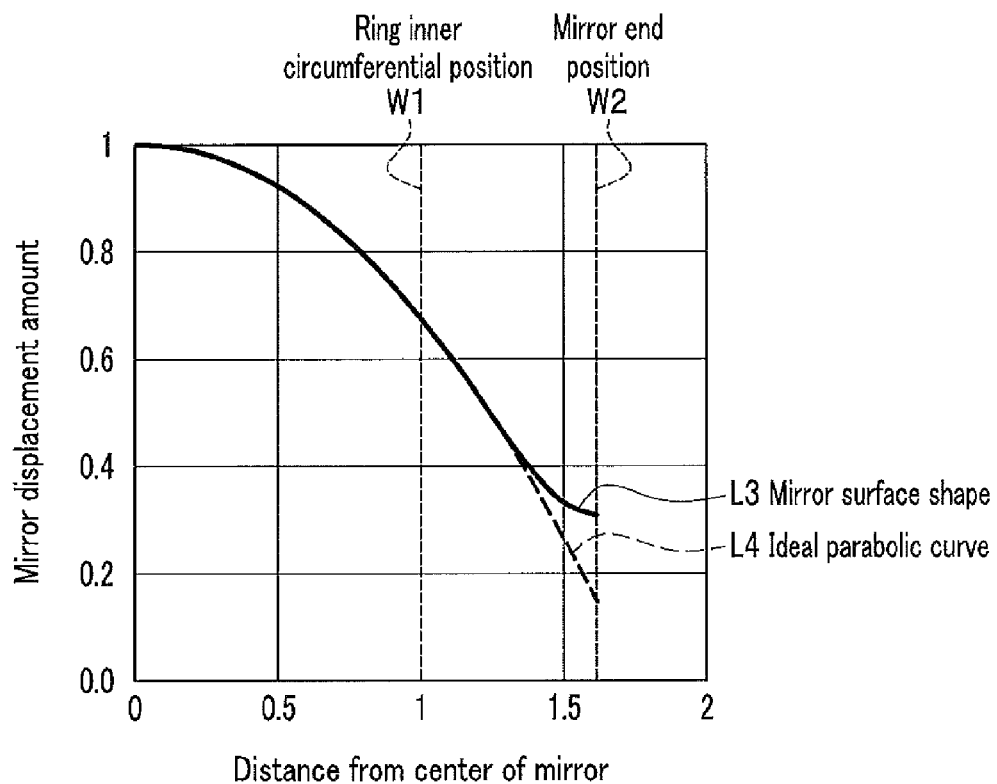
FIG. 12 is a diagram showing the displacement amount of a mirror with respect to the distance from the center of the mirror (the center of a reflection film 27) in a case of applying a magnetic force to a ring-shaped magnetic body.

FIG. 12 is a diagram showing the displacement amount of the mirror (reflection film 27) with respect to the distance from the mirror center (the center of the reflection film 27) in a case of applying a magnetic force to the ring-shaped magnetic body 28 in the second embodiment, wherein the deformation of the mirror surface in the second embodiment is represented by the solid curve (L3), while an ideal parabolic curve of the shape of a mirror surface that ideally reflects a laser beam is represented by the dashed curve (L4).

According to FIG. 12, for the structure in the second embodiment, the deformation of the mirror agrees to a great extent with the ideal parabolic curve L4 of an ideal parabolic shape shown by the dashed curve within the inner surface (the left side from the inner circumferential position W1 of the ring in FIG. 12) of the ring-shaped magnetic body 28, and gradually deviates from the ideal parabolic curve L4 of the ideal parabolic shape as the position is closer to the outer circumferential end 27e (refer to FIG. 4) of the reflection film 27 in the region outside (the right side region with respect to the inner circumferential position W1 of the ring, up to the mirror end position W2 in FIG. 12) the outer circumference of the ring-shaped magnetic body 28.

For an accurate spherical aberration correction, the deviation between the ideal parabolic curve L4 of the ideal parabolic shape and the mirror surface shape L3 of the mirror (reflection film 27) needs to be in the nanometer category or smaller.

On the other hand, the variable mirror actuator A2 needs to be in a small size of approximately several square micrometers to be mounted on the optical pickup P2 (refer to FIG. 3), and thereby the attractive force acting on the ring-shaped magnetic body 28 is extremely decreased, the attractive force being caused by the magnetic field generated by the coil 23 and the yoke 24, which are disposed below the reflection body 27T forming the variable mirror.

On the other hand, for the deformation film 26 and the reflection film 27, the section modulus increases and the stiffness increases with downsizing. Accordingly, in general, it is necessary to set a large distance between the ring inner circumferential position W1 and the mirror end position W2, shown in FIG. 12, and effectively decrease the stiffness of the region outside the outer circumference of the ring-shaped magnetic body 28 (refer to FIG. 4B). That is, downsizing and making a low stiffness of the deformation film 26 and the reflection film 27 of the variable mirror actuator A2 are contradictory phenomena.

In this situation, for the reflection body 97T, shown in FIG. 11, in the ninth embodiment, air spaces 99 are radially and periodically formed in regions 96s, 97s of the deformation film 96 and the reflection film 97, the regions 96s, 97s being outside the outer circumference of the ring-shaped magnetic body 98. By increasing the ratio of a region D2 of an air space 99 per period D1 in the outer-circumferential outer regions 96s, 97s, the stiffness of the outer-circumferential outer regions 96s, 97s outside the ring-shaped magnetic body 98 effectively decreases, which enables both downsizing and making a low stiffness of the deformation film 96 and the reflection film 97 of the variable mirror actuator.

Figure 13:
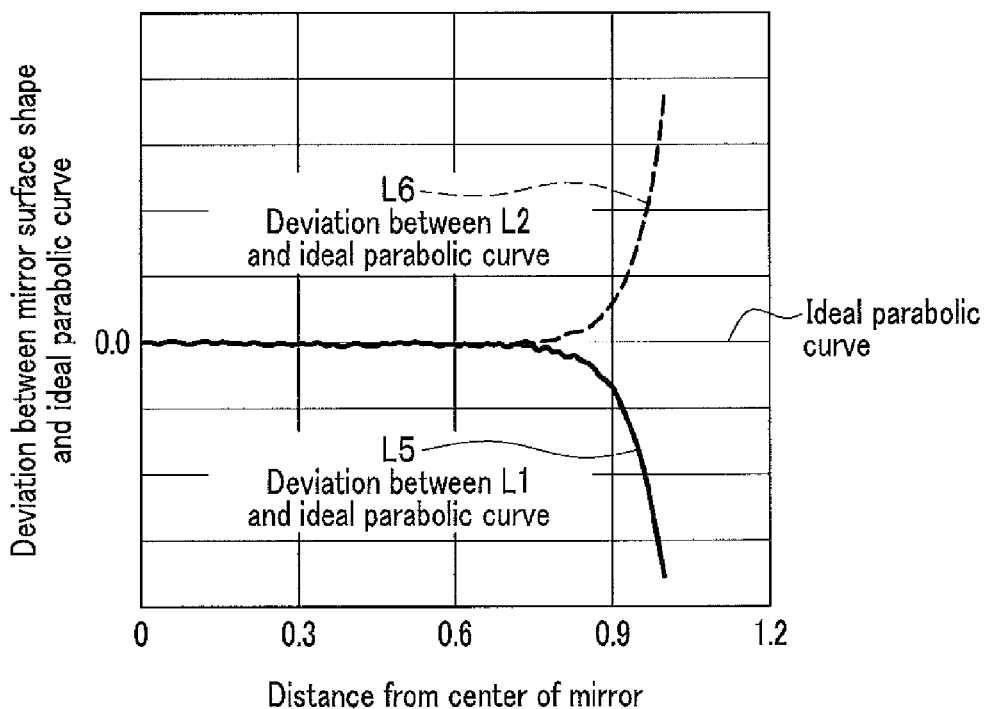
FIG. 13 is a diagram showing deviation between the surface shape of a mirror (reflection film) and an ideal parabolic curve with respect to the distance from the mirror center (the center of the reflection film)

Regarding the deformation of the deformation film 96 and the reflection film 97 in the present ninth embodiment, because the stiffness of the cross-section is different between a beam structure portion L1 and an air space portion L2, shown in FIG. 11, the deviations between the mirror surface shape and the ideal parabolic curve at the respective positions of the beam structure portion L1 and the air space portion L2 are larger, in the respective directions which are opposite to each other with respect to the line for the ideal parabolic curve (the horizontal axis at 0.0), as the distance of the positions from the center of the mirror is larger, as shown in FIG. 13.

FIG. 13 is a diagram showing the deviations between the surface shape of the mirror (the reflection film 97) and the ideal parabolic curve with respect to the distance from the mirror center (the center of the reflection film 97), wherein the line of the deviation (0.0) between the mirror surface shape and the ideal parabolic curve in FIG. 13 represents a line without a deviation between the mirror surface shape and the ideal parabolic curve, namely the ideal parabolic curve.

Therefore, the design is optimized for the distance W3 between the air spaces 99 in the region outside the outer circumference of the ring-shaped magnetic body 98 and the ring-shaped magnetic body 98, the number of the beam structure portions L1, and the size and numbers of the air spaces 99 of the air space portions L2, shown in FIG. 11. Without widening the distance between the ring inner circumference position W1 and the mirror end position W2 virtually forming the mirror, this optimization enables it to make the shape of the mirror agree with the ideal parabolic curve in an ideal parabolic shape with high accuracy in the region inside the inner circumference of the ring-shaped magnetic body 98 and the region outside the inner circumference of the ring-shaped magnetic body 98 up to the mirror end position W2.

Tenth Embodiment

Next, a variable mirror actuator A10 in a tenth embodiment will be described, referring to FIGS. 14A and 14B.

Figure 14A:
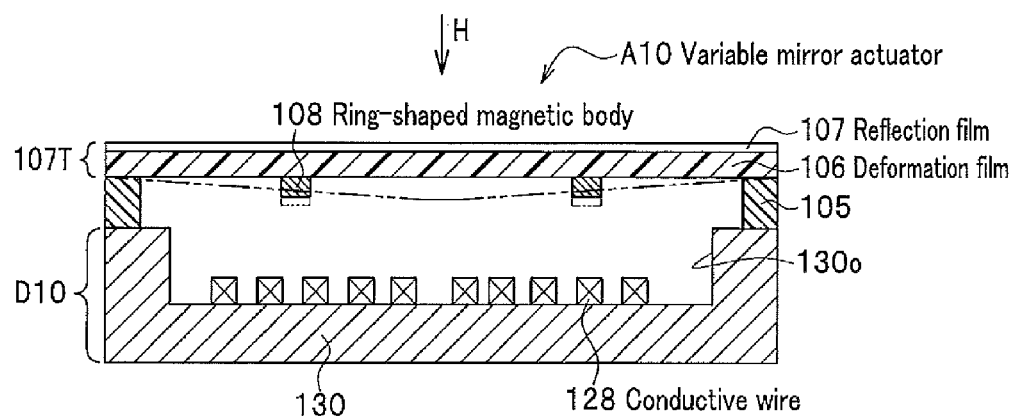
FIG. 14A is a vertical cross-sectional view of a variable mirror actuator, shown as an example, with respect to the axial direction in a tenth embodiment.

FIG. 14A is a vertical cross-sectional view in the axial direction showing an example of the variable mirror actuator A10 in the tenth embodiment. FIG. 14B is a view of a holder 130 and a conductive wire 128 viewed from direction H in FIG. 14A.

An optical pickup (not shown) in the tenth embodiment has a basic structure similar to those of the optical pickups P1 and P2 (refer to FIGS. 1 and 3) in the first and second embodiments, however, the yoke and the coil of the variable mirror actuator A10, shown in FIG. 14A, are different from the yokes 14, 24 and the coils 13, 23 of the variable mirror actuators A1, A2 in the first and second embodiments.

In other aspects, the structure of the variable mirror actuator A10 is similar to those of the variable mirror actuators A1, A2 in the first and second embodiments, and detailed description will be omitted.

Figure 14B:
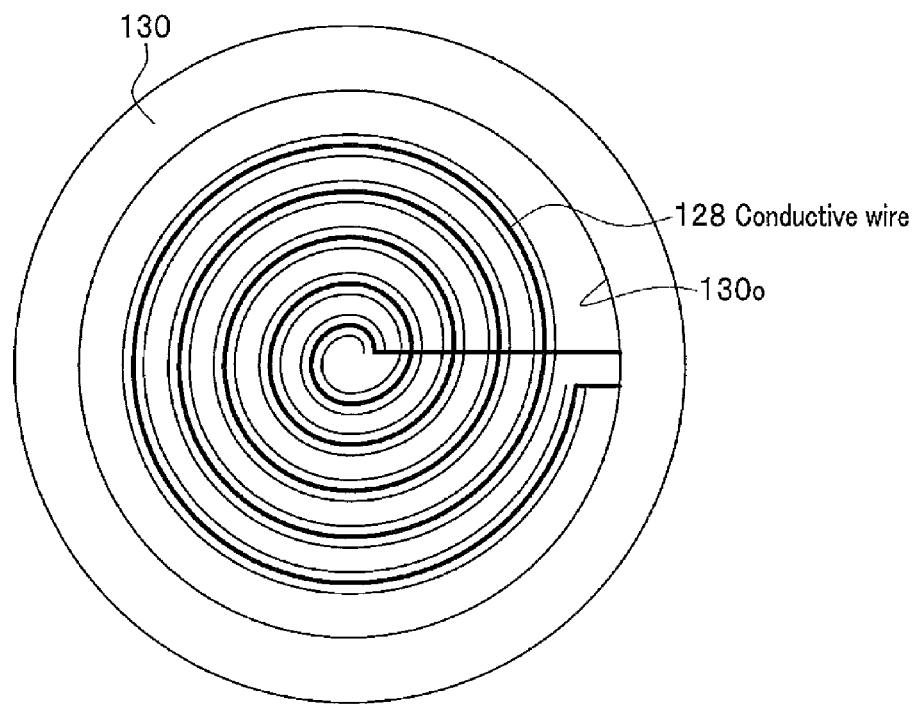
FIG. 14B is a view of a holder and a conductive wire in FIG. 14A, viewed from direction H in FIG. 14A.

In FIGS. 14A and 14B, symbols in the 100s are assigned to respective structural elements of the variable mirror actuator A10.

The difference in structure from those of the variable mirror actuators A1, A2 in the first and second embodiments will be described below.

A holder 130 of the variable mirror actuator A10 in the tenth embodiment, shown in FIGS. 14A and 14B, is formed with a recessed portion 130o in a short-cylindrical shape at the upper central portion and a resin or the like is used for the short cylindrical shape. On the recessed portion 130o of the holder 130, a conductive wire 128 for applying an attractive force, by a magnetic field, to the ring-shaped magnetic body 108 of a reflection body 107T is disposed in a spiral form.

In the variable mirror actuator A10 with this structure, a current is applied to the conductive wire 128 disposed in the spiral form on the recessed portion 130o in the holder 130, and thereby a ring-shaped magnetic body 108 generates a magnetic field for an attractive force. This magnetic field attracts the ring-shaped magnetic body 108 toward the conductive wire 128 so that the ring-shaped magnetic body 108 deforms a deformation film 106 fixed thereon and a reflection film 107 into a parabolic shape approximated to an ideal parabolic curve.

According to the tenth embodiment, as the conductive wire 128 is planospiral, the structure of the holder 130 and the conductive wire 128 can be made thin. As a result, the entire shape of the variable mirror actuator A10 can be made thin compared with the first and second embodiments.

Further, the shape of the holder 130 of the variable mirror actuator A10 can also be made simple, allowing it to attempt improvement in the productivity and reduction in production cost.

In the tenth embodiment, an example has been described for a case of forming the spiral conductive wire 128 in a flat shape, however, the spiral conductive wire 128 may be formed with protruding-and-recessed portions as long as magnetic field can be generated for an attractive force for deforming the reflection film 107 into an ideal parabolic curve. Further, the ring-shaped magnetic body 108 may be laminated on the reflection film and fixed thereon.

Advantages

According to the first to tenth embodiments, if a drive force from an electromagnet D1, . . . , D10 acts on a circular or elliptical ring-shaped magnetic body 18, . . . , 68, a magnetic ring 78, a high conductive body 88, a ring-shaped magnetic body 98, 108, which is fixed on a deformation film 16, . . . , 106, then a ring-shaped force distribution of the circular or elliptical ring-shaped magnetic body 18, . . . , 68, the magnetic ring 78, the high conductive body 88, the ring-shaped magnetic body 98, 108 acts on the deformation film 16, . . . , 106.

Thus, the deformation film 16, . . . , 106 and the reflection film 17, . . . , 107 inside the ring-shaped magnetic body 18, . . . , 68, the magnetic ring 78, the high conductive body 88, the ring-shaped magnetic body 98, 108 can be formed into an ideal parabolic curve shape.

Further, in this structure, the warp amount from the center of the ring-shaped magnetic body 18, . . . , 68, the magnetic ring 78, the high conductive body 88, the ring-shaped magnetic body 98, 108 becomes uniform in a concentric circle state or a concentric elliptical state.

Therefore, even when the deformable deformation film 16, . . . , 106 and the deformable reflection film 17, . . . , 107 warp and deform, the distance between the ring-shaped magnetic body 18, . . . , 68, the magnetic ring 78, the high conductive body 88, the ring-shaped magnetic body 98, 108 and the electromagnet D1, . . . , D10 is the same at any position of the ring shape, and thus a force can be applied to the deformable deformation film 16, . . . , 106 and the deformable reflection film 17, . . . , 107 such that the stress distribution is uniform.

Further, because the force acting on the ring-shaped magnetic body 18, . . . , 68, the magnetic ring 78, the high conductive body 88, the ring-shaped magnetic body 98, 108 is dependent on the current value driving the electromagnet D1, . . . , D10, the spherical aberration can be corrected in multiple stages by controlling the drive current value.

In the first to tenth embodiments, an example of a case where the reflection film 17 or the like is circular or elliptical has been described because it has been assumed that a laser beam from the laser light source has a circular cross-section. However, the reflection film 17 or the like may be not necessarily be circular nor elliptical as long as a laser beam reflected by the reflection film 17 becomes circular. Further, when the cross-section of a laser beam from the laser light source 7 is assumed to have a shape other than a circle, the reflection film 17 may be not circular nor elliptical. Incidentally, in handling an optical system or the like, as the cross-section of a laser beam from the laser light source 7 is preferably circular, the shape of the reflection film or the like is most preferably circular, and preferably elliptical.

Still further, in the first to tenth embodiments, an example of a ring-shaped magnetic body 18, . . . , 68, the magnetic ring 78, the ring-shaped magnetic body 98, 108, which is continuous in a ring shape, has been described. However, as long as the reflection film 17, . . . , 77, 97, 107 can be formed into an ideal parabolic curve shape, the ring-shaped magnetic body 18, . . . , 68, the magnetic ring 78, the ring-shaped magnetic body 98, 108 may be not necessarily continuous in a ring shape.

Incidentally, in the first to tenth embodiments, an example in a case of providing the deformation film 16, . . . , 106 has been described. However, as long as the reflection film 17, . . . , 107 can be formed with a strength greater than or equal to a predetermined value, and the ring-shaped magnetic body 18, . . . , 68, the high conductive body 88, the ring-shaped magnetic body 98, 108 can be joined with the reflection film 17, . . . , 67, 87, . . . , 107, or the magnetic ring 78 can be made come in contact with the reflection film 76 and the reflection film 76 can be pressed by the compression coil springs 78s, it is not required to provide the deformation film 16, . . . , 106.

Still further, in the first to tenth embodiments, the respective structures have been individually described. However, the structures in the first to tenth embodiments may be appropriately combined.

Eleventh Embodiment

Figure 17:
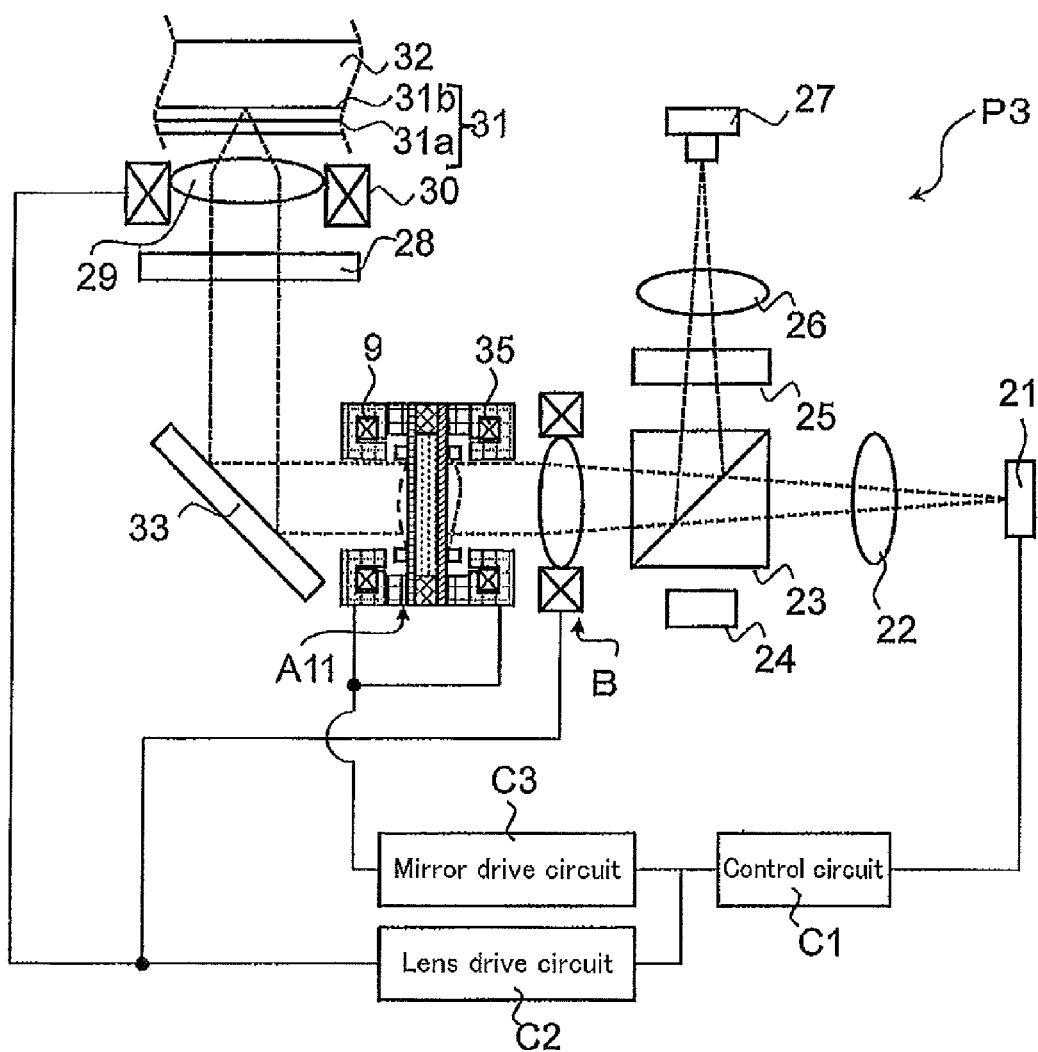
FIG. 17 is a schematic view of an optical pickup having a plurality of spherical aberration correction mechanisms in an eleventh embodiment.

FIG. 17 is a view showing an example of the outline of an optical system of an optical pickup P3, in the present embodiment, in which a variable-focus lens actuator A11 of a variable-focus lens device and a movable lens actuator B of a movable lens device are incorporated. Aspects overlapping with the first embodiment will be omitted in the description of FIG. 17.

The variable-focus lens actuator A11 in the eleventh embodiment enables arbitrary deformation of both the incident and transmission surfaces which a laser beam passes through, and correction of spherical aberration and coma aberration and/or astigmatism. Further, the movable lens actuator B moves the position of a lens in the optical axis direction, and thus enables correction of spherical aberration.

On an optical path of a laser beam from a laser light source 27 to a detector 21 through a recording layer 31 of an optical disc 32, the optical pickup P3 is provided with a polarized light beam splitter 23 that splits a laser beam from the laser light source 27 or the recording layer 31 of the optical disc 32 by reflection and transmission; the movable lens actuator B that transmits a laser beam toward the direction of a reflection mirror 33, the laser beam having been emitted from the laser light source 27 and reflected by the polarized light beam splitter 23, and converts the divergence angle of the laser beam; the variable-focus lens actuator A11; a mirror 33 that reflects the laser beam having passed through the variable-focus lens actuator A11 toward the recording layer 31 of the optical disc 32 and reflects the laser beam reflected by the recording layer 31 toward the detector 21; a ¼ wavelength plate 28 that converts a linear polarized light into a circular polarized light; an objective lens 29 that is moved by the lens actuator 30 in the optical axis direction and focuses a laser beam onto the recording layer 31 of the optical disc 32; and a condensing lens 22 that focuses the laser beam onto the detector 21, the laser beam having been reflected by the recording layer 31.

Variable-focus Lens Actuator A11

Figure 15:
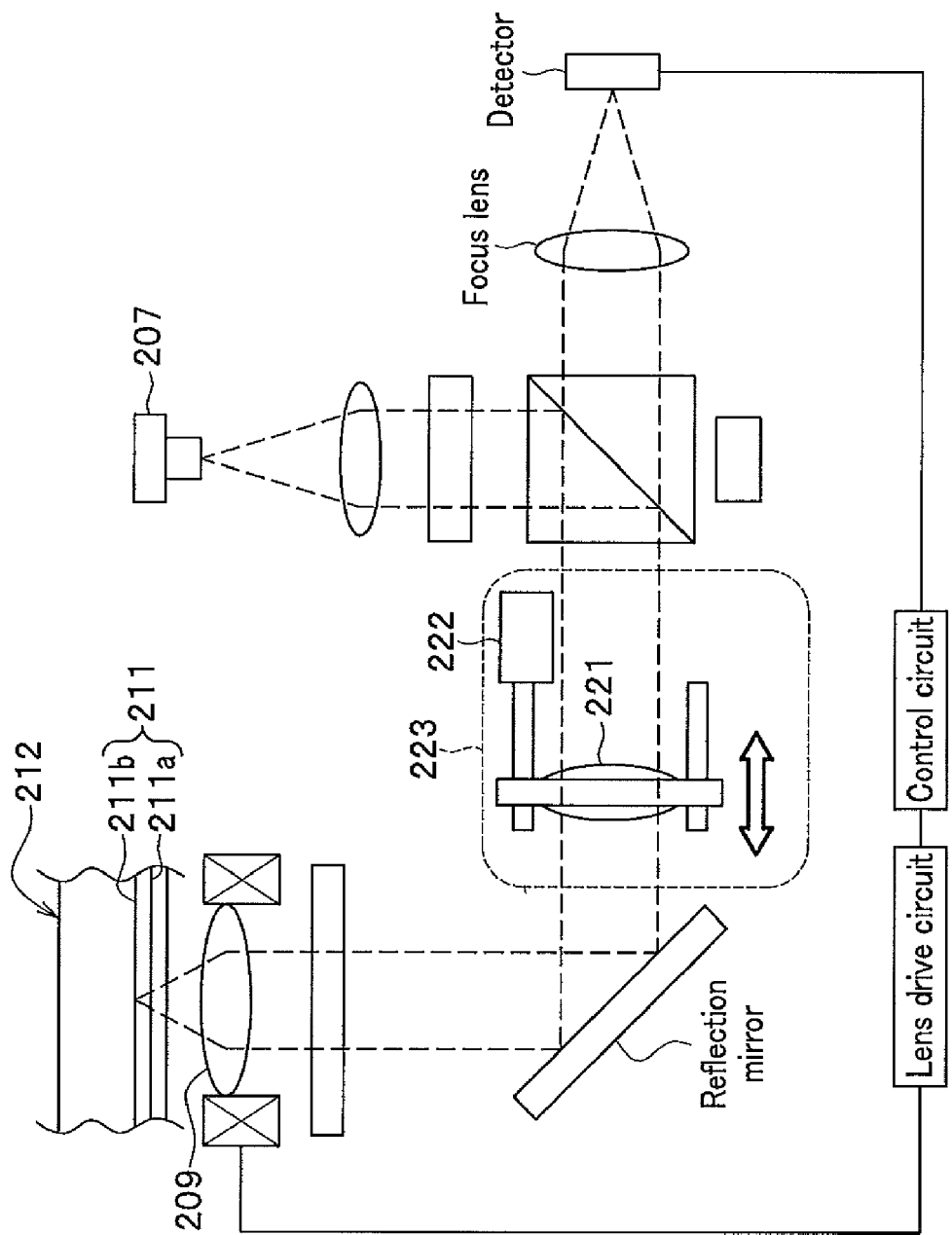
FIG. 15 is a view showing an example of an optical system of an optical pickup having a conventional spherical aberration correction mechanism.
Figure 18A:
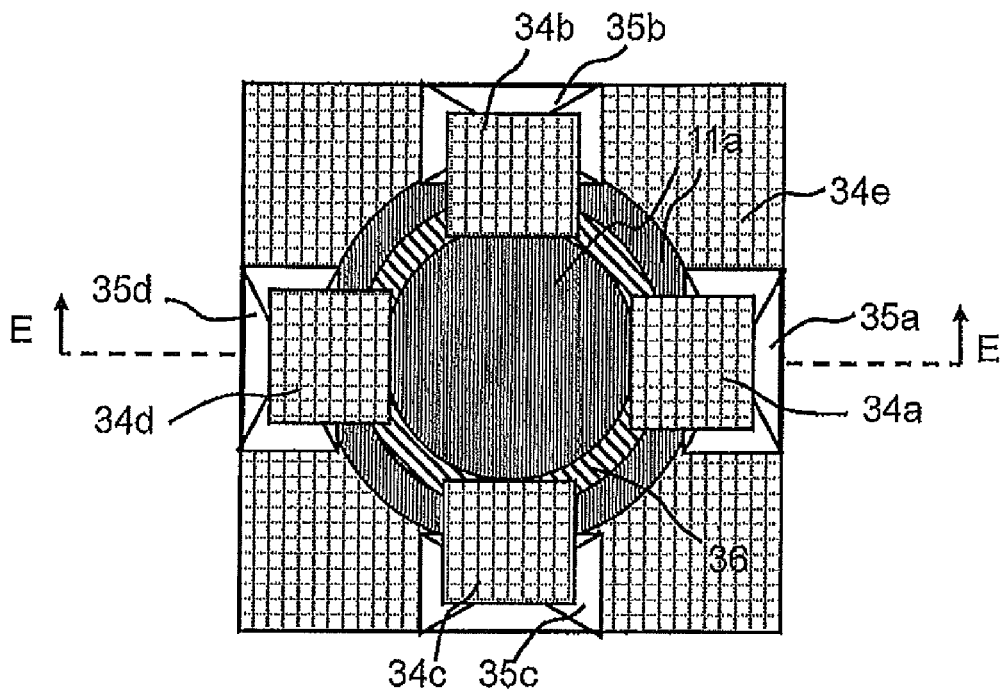
FIGS. 18A and 18B are schematic diagrams showing an example of a variable-focus lens actuator in the eleventh embodiment.
Figure 18B:
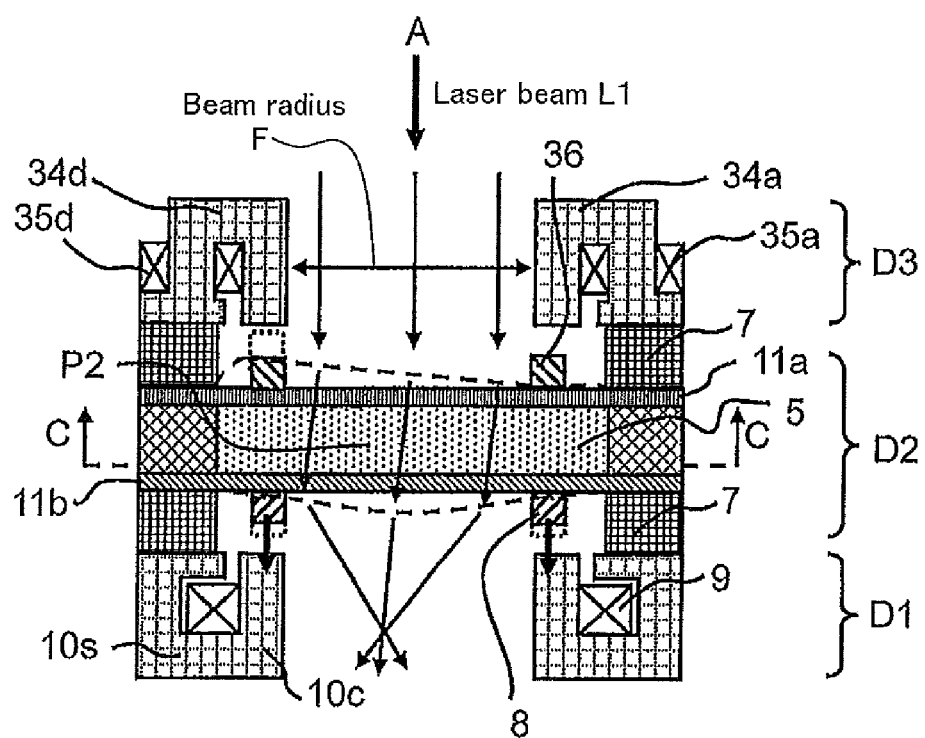

FIG. 18A is a cross-sectional view in the axial direction showing an example of the variable-focus lens actuator A11. FIG. 18B is a cross-sectional view of the variable-focus lens actuator A11 with respect to line E-E in FIG. 18A. Aspects overlapping with the first embodiment will be omitted in the description of FIG. 15.

The variable-focus lens actuator A11 will be described, referring to FIGS. 18A and 18B. A laser beam with a circular cross-section passes through a transparent deformation film 11a, passes through transparent liquid 5, such as matching oil for example, and is refracted by a deformation film 11b to be focused.

Figure 23:
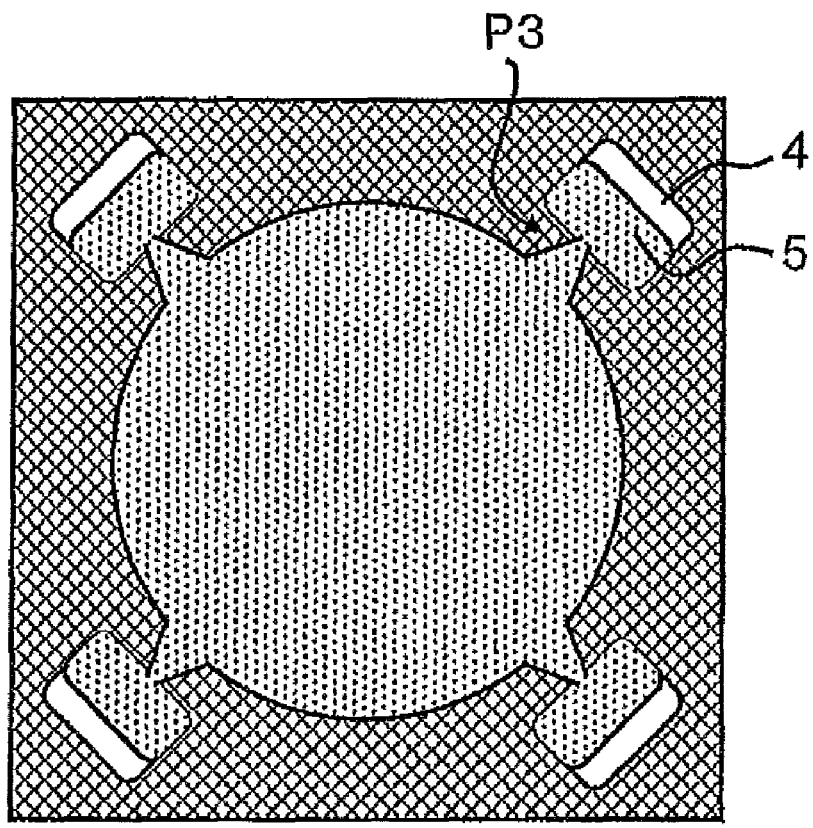
FIG. 23 is a cross-sectional view of a variable-focus lens actuator A1 with respect to line C-C.

The transparent liquid 5 is enclosed between the upper transparent deformation film 11a and the lower transparent deformation film 11b with a spacer therebetween, and a lens region P2 is entirely filled with the transparent liquid 5. A reservoir region P3 (FIG. 23), for reserving the transparent liquid 5 for compensation for a change in the volume of the lens region P2 accompanying a change in the lens curvature, is partially filled with a gas 4; the gas 4 is compressed and expanded accompanying increase and decrease in the transparent liquid 5 in the reservoir regions P3; and thus the transparent liquid 5 in the reservoir region P3 can be increased and decreased.

A ring-shaped magnetic body 36 is fixed on the upper transparent deformation film 11a to arbitrarily tilt the transparent deformation film 11a. The upper transparent deformation film 11a is fixed on the yokes 34 of an electromagnet D3 through a spacer 7.

The spacer 7 is desirably a non-magnetic body such as a resin, and may be formed integrally with the transparent deformation film 11a. The spacer 7 may be formed of a magnetic material as long as the performance of the variable-focus lens actuator A11 is not degraded.

The electromagnet D3 is provided with the yokes 34 of a magnetic material, and coils 35 wound in plural turns around the yokes 34.

The yokes 34 are formed of an iron core of steel plates, ferrite, cobalt, or the like.

By applying different currents to the four coils 35a, 35b, 35c, and 35d, the incident surface can be arbitrarily tilted with the strength distributions of magnetic fields generated through the yokes 34a, 34b, 34c, and 34d. Incidentally, the yokes 34 and the coils 35 may be not in a quantity of four, and a similar effect can be attained also by three yokes.

In the variable-focus lens actuator A11 with this structure, currents are applied to the coils 35 of the electromagnet D3; thereby the yokes 34 generate strong magnetic fields to attract the ring-shaped magnetic body 36 on the transparent deformation film 11a; thereby the transparent liquid 5 in the reservoir regions P3 gradually flows into the reservoir region P2; and accompanying this, the warp amount of the transparent deformation film 11a increases. Then, the deformation force of the transparent deformation film 11a and a force acting on the ring-shaped magnetic body 36 come to balance each other, and a constant warp amount is maintained after a point that reaches a target warp amount. By changing the currents applied to the coils 35a, 35b, 35c, and 35d of the electromagnet D3, the transparent deformation film 11a is arbitrarily tilted, and the proceeding direction of a laser beam having passed through the transparent deformation film 11a changes, depending on the warp amount of the transparent deformation film 11a. The warp amount of the transparent deformation film 11a depends on the current values applied to the coils 35a, 35b, 35c, and 35d, and is controlled to deform the transparent deformation film 11a into a suitable shape for correction of coma aberration and astigmatism.

On the other hand, regarding the lower transparent deformation film 11b, the function and the structure are similar to the case of the variable lens actuator A1 in the first embodiment, and description will be omitted.

The correction amount of the spherical aberration due to the deformation of the transparent deformation film 11b depends on the convergence degree/divergence degree of an incident light beam entering the variable-focus lens actuator A11 and the deformation amount. A large spherical aberration SA1, which is caused by deformation of the transparent deformation film 11b or lamination of multiple layers of an optical disc, may be corrected, and a spherical aberration SA2 smaller than the above-described spherical aberration SA1 may be corrected, wherein the spherical aberration SA2 is caused by the objective lens due to error variation in the substrate thickness, variation in the wavelength of laser, or variation in temperature.

Movable Lens Actuator B

A movable lens actuator B uses, for example, a stepping motor as the drive source, a lead screw formed with a spiral groove is fitted to the shaft of the stepping motor, and a lens holder having a lens mounted thereon is supported by the groove of the lead screw. The lead screw is rotated by driving the stepping motor, and thereby the lens supported by the groove of the lead screw is moved straight in the optical axis direction. The movement amount of the lens can be controlled according to the number of steps of the stepping motor. This stepping motor has steps, for example, of approximately 10 µm, and the correction amount of spherical aberration per step can be designed with the focal length of the lens or the magnification of the optical system. In relation with the magnification, the correction amount of spherical aberration per step is substantially proportional to $f^{-2}$, representing the focal length of the moved lens by f. Therefore, for example, by moving a lens with a short focal length, a large spherical aberration SA1 can be corrected with a small movement amount of the lens. Further, by moving a lens with a long focal length, a small spherical aberration SA2 can be corrected with high accuracy.

Reading Record from Recording Layer 31 of Optical Disc 32

Next, reading a record (signal) by a laser beam from the recording layer 31 of an optical disc 32 mounted on an optical pickup P3 will be described, taking an example of reading from the recording layer 31b. Reading a record (signal) from the recording layer 31a is similar.

As shown in FIG. 17, in order to read a pit recorded on the recording layer 31b of the optical disc 32 as an electrical signal, a laser beam emitted from a laser light source 27 is collimated by a collimate lens 26, passed through a grating 25, and then reflected by an polarized light beam splitter 23 toward the movable lens actuator B and the variable-focus lens actuator A11.

Then, the laser beam reflected by the polarized light beam splitter 23 is passed through the movable lens actuator B and the variable-focus lens actuator A11 with the divergence angle thereof being adjusted, reflected by the reflection mirror 33, thereafter passed through the ¼ wavelength plate 28 to be converted into a circular polarized light, focused onto the recording layer 31b by the objective lens 29, and reflected from the recording layer 31b. The laser having been reflected by the recording layer 31b is passed through the objective lens 29 again to be converted into a collimate light, then passed through the ¼ wavelength plate 28 to be converted into a linear polarized light, reflected by the reflection mirror 33, passed through the variable-focus lens actuator A11 and the movable lens actuator B with the divergence angle thereof being adjusted, and then passed toward the polarized light beam splitter 23.

The laser beam having been passed through the polarized light beam splitter 23 is focused by the condensing lens 22 onto the detector 21, and the light intensity entering the detector 21 is converted into an electrical signal.

Based on signals, the signals being calculated by the control circuit C1 based on information having been received by the detector 21 and indicating the warp amounts of the transparent deformation films 11a, 11b of the variable-focus lens actuator A11, currents are applied to the coils 9, 35 of the variable-focus lens actuator A11 from the mirror drive circuit C3. Further, based on a signal indicating the movement amount of the movable lens actuator B calculated by the control circuit C1, a current is applied to the coil of the movable lens actuator B from the lens drive circuit C2.

Thus, the variable-focus lens actuator A11 is caused to generate a strong magnetic field at the central portions of the yokes 10 by the currents flowing in the coils 9, and thereby the ring-shaped magnetic body 8 on the transparent deformation film 11b is attracted toward the electromagnet D1, as shown by the dashed curve in FIG. 17. Accompanying this, the deformation film 11b supported by the electromagnet D1 through the spacer 7 warps into a parabolic shape. Further, the currents flowing in the coils 35 cause the central portions of the yokes 34 to generate a strong magnetic field, and thereby the ring-shaped magnetic body 36 on the transparent deformation film 11a is attracted toward the electromagnet D3, as shown by the dashed curve in FIG. 17. Accompanying this, the deformation film 11a supported by the electromagnet D3 through the spacer 7 tilts.

In such a manner, by applying currents to the coils 9 of the variable-focus lens actuator A11, the transparent deformation film 11b is warped into a desired parabolic shape, and the divergence angle of the laser beam having passed through the transparent deformation film 11b is controlled with the magnitudes of the currents in the coils 9, so as to correct the spherical aberration of the laser beam, the spherical aberration being caused each time the recording layer is switched between the recording layer 31a and the recording layer 31b. Further, by applying currents to the coils 35 of the variable-focus lens actuator A11, the deformation film 11a is tilted for a desired shape, and thus the proceeding direction of the laser beam having passed the transparent deformation film 11a is controlled with the magnitudes of the currents in the coils 35, so as to correct coma aberration and astigmatism caused by the inclination of the optical disc with respect to the optical axis (disc tilt) or an error due to assembling of the optical pickup.

Still further, by applying a current to the coil of the movable lens actuator B, the lens is driven in the optical axis direction to control the divergence angle of the laser beam having passed through the lens, so as to correct spherical aberration of the laser beam, the spherical aberration being caused each time the position of the recording layer 31 is switched between the recording layer 31a and the recording layer 31b.

Spherical aberration to be corrected by the variable-focus lens actuator A11 and the movable lens actuator B will be categorized into large spherical aberration SA1 caused by lamination of multiple layers on an optical disc and spherical aberration SA2 smaller than the spherical aberration SA1, such as spherical aberration caused by an objective lens due to variation in error of the substrate thickness, variation in wavelength of laser, variation in temperature, or other the like.

Herein, the movable lens actuator B and the deformation film 11b correct spherical aberration, and the deformation film 11a corrects astigmatism and coma spherical aberration. Accordingly, combinations of these are as shown in Table 1 and Table 2.

TABLE 1

|  | deformation film 11a | deformation film 11b | movable lens actuator B |
|---|---|---|---|
| large spherical aberration SA1 |  |  | X |
| small spherical aberration SA2 |  | X |  |
| astigmatism, coma spherical aberration | X |  |  |

TABLE 2

|  | deformation film 11a | deformation film 11b | movable lens actuator B |
|---|---|---|---|
| large spherical aberration SA1 |  | X |  |
| small spherical aberration SA2 |  |  | X |
| astigmatism, coma spherical aberration | X |  |  |

Incidentally, in a case of a recording medium that is not a multi-layer recording medium, as it is not necessary, in its nature, to correct large spherical aberration SA1, only small spherical aberration SA2 and astigmatism/coma aberration are corrected.

In the above description, as a variable focus lens, one that changes the surface shape of a deformation film by the use of transparent liquid 5 has been used, however, without being limited thereto, a lens that is entirely liquid and changes the shape thereof by surface tension can also be used. In the above, although the words "deformation film" has been used for convenience, any deformable material may be used without being limited to a thin film.

Further, in the present embodiment, electromagnetic force has been used to deform a mirror, however, electrostatic attractive force may be used, for example. By generating an electrostatic attractive force between opposite electrodes formed by providing a gap between a deformable mirror section and a fixed section, a mirror can be deformed.

Figure 24A:
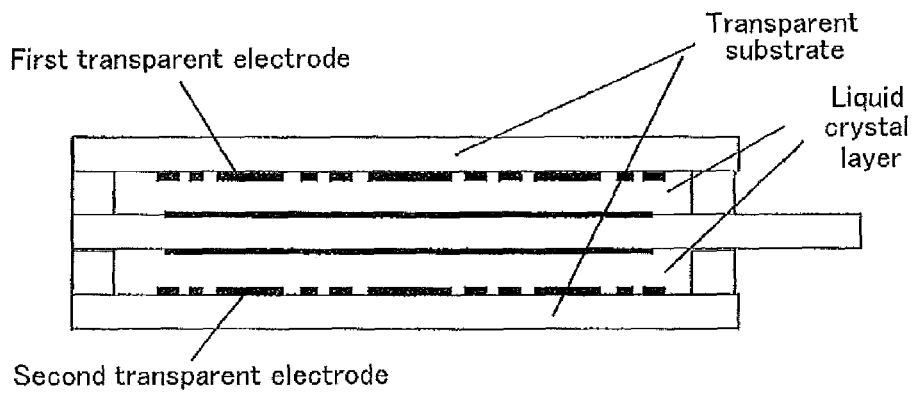
FIGS. 24A to 24C are diagrams showing an embodiment that corrects 'spherical aberration' and 'coma aberration and/or astigmatism', using a liquid crystal element.
Figure 24B:
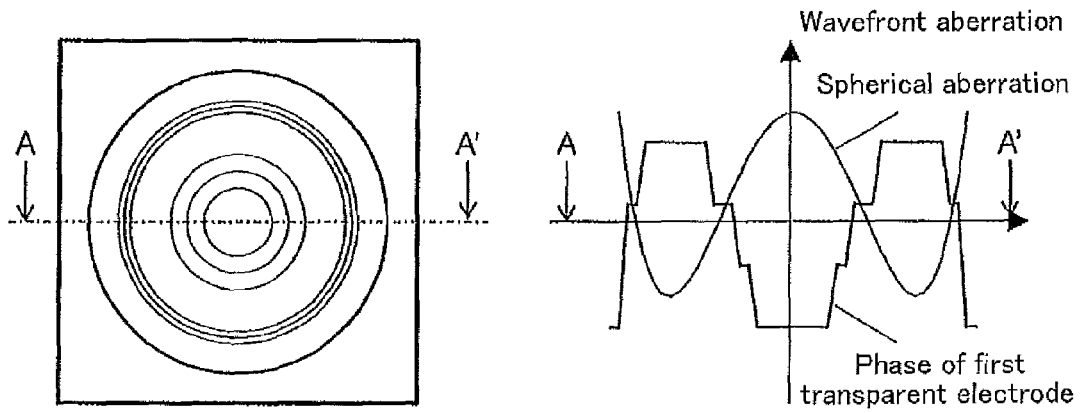
Figure 24C:
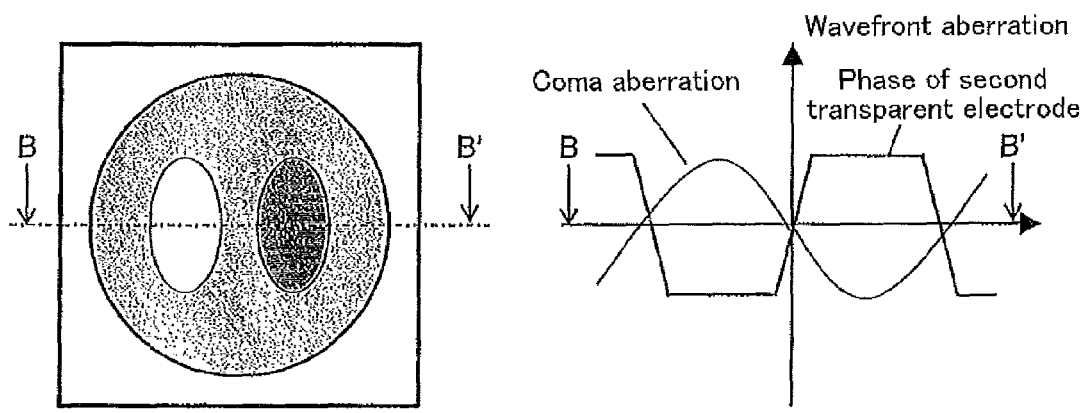

In the present embodiment, an example has been described where a variable-focus lens is used for correction of spherical aberration, and coma aberration and/or astigmatism, however, a liquid crystal element may be used, for example. In this case, this liquid crystal element has a plurality of transparent electrode surfaces, wherein the first transparent electrode is provided with an electrode pattern for correction of spherical aberration, and the second transparent electrode is provided with an electrode pattern for correction of coma aberration and astigmatism. The first transparent electrode corrects large spherical aberration SA1 or small spherical aberration SA2. FIGS. 24A to 24C show an example of the structure of a liquid crystal element. FIG. 24A shows a cross-sectional view of a liquid crystal element. FIG. 24B shows an example of an electrode pattern of the first transparent electrode. FIG. 24C shows an example of an electrode pattern of the second transparent electrode for correction of coma aberration. As shown in FIG. 24A, the liquid crystal element is formed with liquid crystal layers of liquid crystal between two transparent substrates. In order to correct spherical aberration, the first transparent electrode is formed with an electrode pattern of concentric circles, as shown in FIG. 24B, and the electrode pattern is formed such as to generate wavefront aberration with a symbol opposite to that of the spherical aberration to be corrected. The second transparent electrode is formed with an electrode pattern, as shown in FIG. 24C, and the electrode pattern is formed such as to generate wavefront aberration with a symbol opposite to that of aberration wavefront to be corrected.

Twelfth Embodiment

Figure 19:
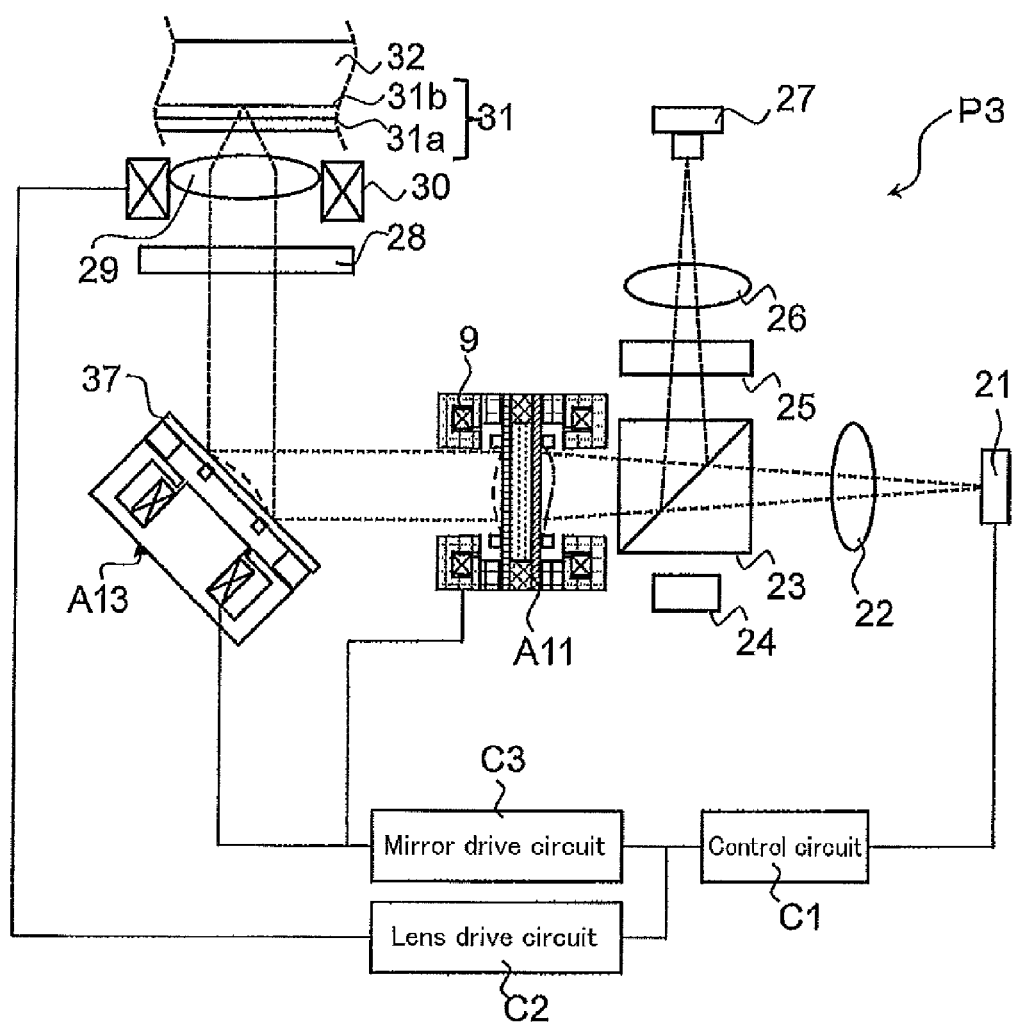
FIG. 19 is a schematic view of an optical pickup having a plurality of spherical aberration correction mechanisms in a twelfth embodiment.

In the eleventh embodiment, a movable lens actuator B has been used to correct spherical aberration, however, a variable mirror actuator may be used instead. FIG. 19 shows an example of the outline of an optical system of an optical pickup P3 incorporating a variable mirror actuator A13 for a variable mirror device instead of a movable lens actuator B. Aspects overlapping with the eleventh embodiment will be omitted in the description of FIG. 19.

The variable mirror actuator A13 of a variable mirror device enables correction of spherical aberration by deforming the reflection mirror surface where a laser beam enters.

On an optical path of a laser beam from a laser light source 27 to a detector 21 through a recording layer 31 of an optical disc 32, the optical pickup P3 is provided with a polarized light beam splitter 23 that splits a laser beam from the laser light source 27 or the recording layer 31 of the optical disc 32 by reflection and transmission; the variable-focus lens actuator A11 that transmits a laser beam toward the variable mirror actuator A3, the laser beam having been emitted from the laser light source 27 and reflected by the polarized light beam splitter 23, and also converts the divergence angle of the laser beam; a variable mirror actuator A13 that reflects the laser beam having passed through the lens actuator A11 toward a recording layer 31 of the optical disc 32 and reflects the laser beam reflected by the recording layer 31 toward the detector 21; a ¼ wavelength plate 28 that converts a linear polarized light into a circular polarized light; an objective lens 29 that is moved by the lens actuator 30 in the optical axis direction and focuses a laser beam onto the recording layer 31 of the optical disc 32; and a condensing lens 22 that focuses the laser beam onto the detector 21, the laser beam having been reflected by the recording layer 31.

Variable Mirror Actuator A13

Figure 20:
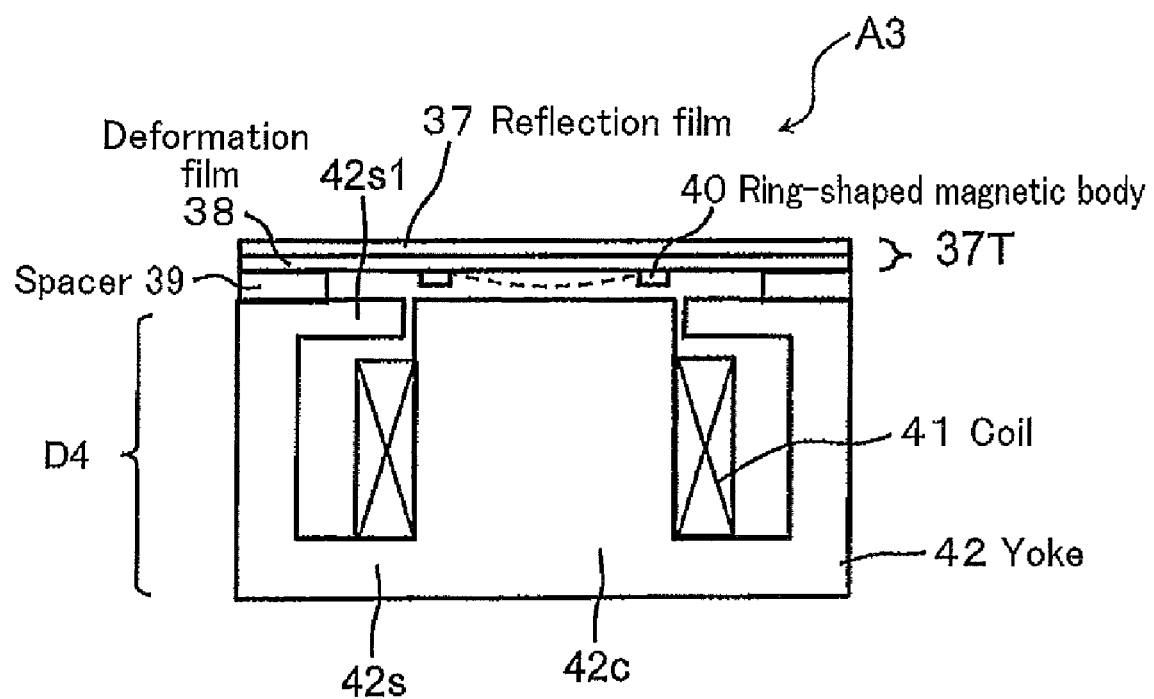
FIG. 20 is a schematic diagram showing an example of a variable mirror actuator in the twelfth embodiment.

FIG. 20 is a vertical cross-sectional view in the axial direction showing an example of a variable mirror actuator in FIG. 19.

In the variable mirror actuator A13, a reflection film 37 reflecting a laser beam, as shown in FIG. 19, is formed in a flat plate shape, using a dielectric multi-layer film or the like containing metal such as aluminum or silver, SiO2, or TiO2. In such a manner, the reflection film 37 may be a single layer film of metal or the like, and also may be a multi-layer reflection film using a dielectric or the like.

Herein, a laser beam has a circular cross-section and enters the reflection film 37 with an angle of 45 degrees. Therefore, the reflection film 37 is formed in an elliptical flat plate longitudinal in the proceeding direction of the laser beam so that the reflected laser beam has a circular cross-section similar to the cross-section before the reflection.

The reflection film 37 is, as shown in FIG. 20, laminated on one surface of a deformation film 38, such as a silicon substrate for example, with an elliptical shape being the same as the shape of the reflection film 37. The deformation film 38 may be formed by any deformable material without being limited to a silicon substrate.

On the other surface of the deformation film 38, a ring-shaped magnetic body 40 is laminated and fixed so as to warp the reflection film 37 into a parabolic shape that reflects the laser beam into a laser beam similar to the laser beam before the reflection. The ring-shaped magnetic body 40 may be laminated on the reflection film and fixed.

The ring-shaped magnetic body 40 is formed using a magnetic material. As shown in FIG. 19, a laser beam enters the reflection film 37 with an angle of 45 degrees. Therefore, the ring-shaped magnetic body 40 is formed in a ring shape being, similarly to the reflection film 37 and the deformation film 38, elliptical and longitudinal in the proceeding direction of the laser beam so that the reflected laser beam has a circular cross-section similar to the cross-section before the reflection. The ring-shaped magnetic body 40 desirably has a structure with a low stiffness so as not to inhibit the deformation film 38 from deforming by the stiffness thereof.

The ring-shaped magnetic body 40 may be formed of any material, without being limited, that is susceptible to a magnetic force by a magnetic field, for example, a composite material of a photoresist with dispersed magnetic powders, A ring structure with a plural laminated layers, formed in such a manner by the reflection film 37 laminated on one surface of the lamination film 38 and the ring-shaped magnetic body 40 laminated on the other surface of the deformation film 38, will be hereinafter referred to as a reflection body 37T (refer to FIG. 20).

As shown in FIG. 20, in the variable mirror actuator A13, a reflection body 37T is provided on an electromagnet D4 through a ring-shaped spacer 39 having an elliptical outer circumferential shape similar to those of the reflection film 37 and the deformation film 38.

The spacer 39 is desirably a non-magnetic body of a resin material or the like, and may be formed integrally with the deformation film 38. The spacer 39 may be formed of a magnetic material as long as the performance of the variable mirror actuator A3 is not degraded.

The electromagnet D4 is provided with a magnetic yoke 42 and a coil 41 wound in plural turns around the yoke central portion 42c forming the central portion of the yoke 42.

The yoke 42 of the electromagnet D4 has the yoke central portion 42c being an elliptical column with a cross-section of an elliptical shape similar to the ring-shaped magnetic body 40, and a yoke peripheral portion 42s formed continuously with the lower outer circumference of the yoke central portion 42c. The yoke peripheral portion 42s has a cross-section along the axial direction in a C-shape opening inward and an outer circumferential shape in an elliptical shape similar to the reflection film 37 and the deformation film 38.

The yoke 42 is formed by an iron core of lamination of plural thin steel plates, ferrite, cobalt, or the like.

When a current is applied to the coil 41 of the electromagnet D4, the yoke 42 generates a strong magnetic field, and thus the variable mirror actuator A13 with this structure attracts the ring-shaped magnetic body 40 of the reflection body 37T to warp the deformation film 38 and the reflection film 37 into a parabolic shape as shown by the dot curve in FIG. 20. In such a manner, by warping the reflection film 37 into a parabolic shape suitable for aberration correction, the divergence angle of a laser beam reflected by the reflection film 37 is controlled. Thus, the spherical aberration of a laser beam generated by a change in the position of the recording layer 31 from the position p1 of the recording layer 31a to the position p2 of the recording layer 31b, shown by FIG. 19, is corrected.

Herein, compared with a structure having only the yoke central portion 42c in a simple elliptical column shape formed inside the coil 41, the structure of the yoke 42, shown in FIG. 20, continuously added with the yoke peripheral portion 42s in a coaxial elliptical shape in the region outside the outer circumference of the coil 41 is more desirable because the structure of the yoke 42, shown in FIG. 20, causes a higher density of magnetic field lines around the coil 41 to make the magnetic force acting on the ring-shape magnetic body 40 stronger.

For example, as shown in FIG. 20, by forming a yoke peripheral upper portion 42s1 at the yoke peripheral portion 42s with the C-shaped cross section, the magnetic field formed around the coil 41 comes to have a higher density, and thereby a stronger magnetic force can be applied to the ring-shaped magnetic body 40.

The yoke 42 may be, of course, formed only by the yoke central portion 42c.

Reading of Record from Recording Layers 31 of Optical Disc 32

Next, reading of a record (signal) by a laser beam from a recording layer 31 of the optical disc 32 mounted on the optical pickup P3 will be described, taking an example of reading a record from the recording layer 31b. Incidentally, reading a record (signal) from the recording layer 31a is similar.

As shown in FIG. 19, in order to read a pit recorded on the recording layer 31b of the optical disc 32 as an electrical signal, a laser beam emitted from the laser light source 27 is collimated by the collimate lens 26, passed through the grating 25, and then reflected by the polarized light beam splitter 23 toward the variable-focus lens actuator A11.

Then, the laser beam reflected by the polarized light beam splitter 23 is passed through the variable-focus lens actuator A11 with the divergence angle thereof being adjusted, reflected by the variable mirror actuator A13, then passed through the ¼ wavelength plate 28 to be converted into a circular polarized light, focused on the recording film 31b by the objective lens 29, and reflected from the recording film 31b. The laser beam reflected by the recording film 31b is passed again through the objective lens 29 to be converted into a collimate light, then passed through the ¼ wavelength plate 28 to be converted into a linear polarized light, reflected by the variable mirror actuator A13, and then passed through the variable-focus lens actuator A11, with the divergence angle being adjusted, toward the polarized light beam splitter 23.

The laser beam having been passed through the polarized light beam splitter 23 is focused by the condensing lens 22 onto the detector 21, and the light intensity entering the detector 21 is converted into an electrical signal.

Based on a signal, the signal being calculated by the control circuit C1 based on information having been received by the detector 21 and indicating the deformation amount of the variable mirror actuator A13, a current is applied to the coil 41 of the variable mirror actuator A13 from the mirror drive circuit C3.

Thus, the variable mirror actuator A13 is caused to generate a strong magnetic field at the central portion of the yoke 42 by the current flowing in the coil 41, and thereby the ring-shaped magnetic body 40 of the reflection body 37T is attracted toward the electromagnet D4, as shown by the dashed curve in FIG. 20. Accompanying this, the deformation film 38 and the reflection film 37 of the reflection body 37T supported by the electromagnet D4 through the spacer 39 warp into a parabolic shape In such a manner, by applying a current to the coil 41 of the variable mirror actuator A13, the reflection film 37 is warped into a desired parabolic shape, and the divergence angle of the laser beam having been reflected by the reflection film 37 is controlled with the magnitude of the current in the coil 41, so as to correct the spherical aberration of the laser beam, the spherical aberration being caused each time the position of the recording layer 31 is switched between the position p1 (the recording layer 31a) and the position p2 (the recording layer 31b). This structure may be used for correction of large spherical aberration SA1 and correction of small spherical aberration SA2.

What is claimed is:

1. A variable mirror actuator, comprising:
    a reflection member configured to reflect emitted light;
    a ring-shaped magnetic force applying member configured to apply a warping force to the reflection member when a magnetic field is applied to the ring-shaped magnetic force applying member; and
    an electromagnetic structure including a coil and a stationary unitary yoke, that is configured to apply the magnetic field to the ring-shaped magnetic force applying member so that the reflection member is warped into a desired shape when a current is applied to the electromagnetic structure, wherein the stationary unitary yoke includes a yoke central portion and a yoke peripheral portion, the coil being wound around the yoke central portion, but no coil around the yoke peripheral portion.

2. The variable mirror actuator according to claim 1, wherein the reflection member and the ring-shaped magnetic force applying member each have either a circular or elliptical shape.

3. The variable mirror actuator according to claim 1, further comprising:
    a variable structure member provided between the reflection member and the ring-shaped magnetic force applying member, and configured to receive a force from the ring-shaped magnetic force applying member to warp the reflection member into a desired shape.

4. The variable mirror actuator according to claim 3, wherein the variable structure member comprises a concentric protruding-and-recessed structure outside an outer circumference of the ring-shaped magnetic force applying member, the concentric protruding-and-recessed structure formed such that a protruding portion is smaller as the protruding portion is closer to an outer circumferential end.

5. The variable mirror actuator according to claim 3, wherein the variable structure member comprises a protruding rib structure outside an outer circumference of the ring-shaped magnetic force applying member, the rib structure formed radially and thinner toward an outer circumferential end.

6. The variable mirror actuator according to claim 3,
    wherein the variable structure member is formed with opening portions in a region outside the ring-shaped magnetic force applying member,
    and wherein an area ratio in a region of the variable structure member is determined such that the reflection member warps into a desired shape, the region disposed outside the ring-shaped magnetic force applying member, between the opening portions and non-opening portions, and the non-opening portions disposed in a region excluding the opening portions.

7. The variable mirror actuator according to claim 1, wherein the ring-shaped magnetic force applying member comprises a magnetic material.

8. The variable mirror actuator according to claim 1,
    wherein the ring-shaped magnetic force applying member comprises a high conductive material in a ring shape,
    and wherein, when a change in the magnetic field is caused by the electromagnet structure, the ring-shaped magnetic force applying member is configured to generate an induced electromotive force in a ring circumferential direction and a reaction force against the change in the magnetic field.

9. The variable mirror actuator according to claim 8, wherein the current applied to the electromagnet is in a temporally non-linear waveform including a triangle wave or a half sine wave.

10. The variable mirror actuator according to claim 1, further comprising:
    a pressing member configured to press the ring-shaped magnetic force applying member, wherein the ring-shaped magnetic force applying member comprises a magnetic material, and wherein the variable mirror actuator is configured to warp the reflection member into a desired shape by:

an attractive force acting on the ring-shaped magnetic force applying member, the attractive force caused by the magnetic field generated by the electromagnet structure; and a pressing force applied to the ring-shaped magnetic force applying member by the pressing member, in a direction opposite to a direction of the attractive force.

11. The variable mirror actuator according to claim 1, wherein the electromagnetic structure is formed with a hole at a central portion of the stationary unitary yoke, the hole extending in an axial direction of winding a coil.

12. The variable mirror actuator according to claim 1, wherein the electromagnetic structure comprises a conductive wire, in a winding shape, to which the current is applied.

13. The variable mirror actuator according to claim 1, wherein the coil is disposed in a cavity of the stationary unitary yoke.

14. The variable mirror actuator according to claim 1, wherein the stationary unitary yoke includes a centrally placed iron core laminated by a plurality of metal plates.

15. The variable mirror actuator according to claim 14, wherein the metal plates include at least one of: steel, ferrite, or cobalt.

16. The variable mirror actuator according to claim 1, wherein a diameter of the stationary unitary yoke is equal to a diameter of the reflection member.

17. The variable mirror actuator according to claim 1, wherein a diameter of the ring-shaped magnetic force applying member is equal to a diameter of the yoke central portion.

18. The variable mirror actuator according to claim 1, wherein a diameter of the ring-shaped magnetic force applying member is greater than a diameter of the yoke central portion.

19. The variable mirror actuator according to claim 1, wherein a deformation member covers a surface of the reflection member, and is disposed between the reflection member and the yoke peripheral portion.

20. The variable mirror actuator according to claim 19, wherein a ring-shaped spacer disposed on the yoke peripheral portion, such that the deformation member and the reflection member are separated from the stationary unitary yoke, the ring-shaped spacer having a diameter equal to a diameter of stationary unitary yoke and a diameter of the deformation member.

* * * * *